United States Patent
Takahashi et al.

(10) Patent No.: US 12,338,892 B2
(45) Date of Patent: Jun. 24, 2025

(54) INTEGRATED PUMP DEVICE

(71) Applicant: DENSO CORPORATION, Kariya (JP)

(72) Inventors: Tomohiro Takahashi, Kariya (JP); Kazunori Uchida, Kariya (JP); Motoyoshi Ando, Kariya (JP)

(73) Assignee: DENSO CORPORATION, Kariya (JP)

(*) Notice: Subject to any disclaimer, the term of this patent is extended or adjusted under 35 U.S.C. 154(b) by 26 days.

(21) Appl. No.: 18/335,022

(22) Filed: Jun. 14, 2023

(65) Prior Publication Data

US 2023/0323949 A1  Oct. 12, 2023

Related U.S. Application Data

(63) Continuation of application No. PCT/JP2021/027431, filed on Jul. 22, 2021.

(30) Foreign Application Priority Data

Dec. 17, 2020  (JP) ................. 2020-209129

(51) Int. Cl.
| | |
|---|---|
| *F15B 15/18* | (2006.01) |
| *F04C 13/00* | (2006.01) |
| *F15B 15/26* | (2006.01) |
| *F16H 63/34* | (2006.01) |

(52) U.S. Cl.
CPC ....... *F16H 63/3483* (2013.01); *F04C 13/002* (2013.01); *F15B 15/18* (2013.01); *F15B 15/26* (2013.01); *F04C 2210/206* (2013.01)

(58) Field of Classification Search
CPC .......... F15B 15/18; F15B 15/12; F15B 15/26; F16D 63/006
See application file for complete search history.

(56) References Cited

U.S. PATENT DOCUMENTS

| | | | |
|---|---|---|---|
| 2001/0008129 A1 | 7/2001 | Yamada | |
| 2011/0085921 A1* | 4/2011 | Kato | ........................ F01M 1/16 417/213 |
| 2020/0103015 A1 | 4/2020 | Okuhata | |
| 2022/0243799 A1 | 8/2022 | Okuhata | |

FOREIGN PATENT DOCUMENTS

| | | |
|---|---|---|
| JP | H09217610 A | 8/1997 |
| JP | 2008169907 A | 7/2008 |
| JP | 2014185651 A | 10/2014 |
| WO | 2020043235 A1 | 3/2020 |

* cited by examiner

*Primary Examiner* — Kenneth Bomberg
*Assistant Examiner* — Daniel S Collins
(74) *Attorney, Agent, or Firm* — Nixon & Vanderhye P.C.

(57) ABSTRACT

An integrated pump device includes a motor, an oil pump rotated by a driving force of the motor and configured to discharge oil drawn from an oil pan, and a hydraulic actuator configured to switch between an advance state and a retard state by a hydraulic pressure created by the oil pump. The hydraulic actuator is a parking lock actuator, and includes a housing having vane chambers and a vane rotor housed in the housing and including vanes arranged in the vane chambers. The vane rotor is configured to rotate to enter the advance state when the hydraulic pressure is supplied to an advance chamber, and to rotate to enter the retard state when the hydraulic pressure is supplied to a retard chamber. The parking lock actuator locks a parking lock mechanism at the advance state, and unlocks the parking lock mechanism at the retard state.

6 Claims, 18 Drawing Sheets

INTEGRATED PUMP DEVICE

CROSS REFERENCE TO RELATED APPLICATIONS

The present application is a continuation application of International Patent Application No. PCT/JP2021/027431 filed on Jul. 22, 2021, which designated the U.S. and claims the benefit of priority from Japanese Patent Application No. 2020-209129 filed on Dec. 17, 2020. The entire disclosures of all of the above applications are incorporated herein by reference.

TECHNICAL FIELD

The present disclosure relates to an integrated pump device.

BACKGROUND

A hydraulic system integrating a motor, an electric oil pump, and a hydraulic actuator is known.

SUMMARY

According to at least one embodiment, an integrated pump device is a module in which a motor, an oil pump, and a hydraulic actuator are integrated with each other.

The oil pump discharges oil drawn from an oil pan by a driving force of the motor. The hydraulic actuator switches between an advance state and a retard state by a hydraulic pressure created by the oil pump. The hydraulic actuator is a parking lock actuator which operates a parking lock mechanism of an automobile.

The hydraulic actuator includes a housing having one or more vane chambers, and a vane rotor housed in the housing and including on one or more vanes arranged in the vane chambers.

The vane is capable of rotating in a circumferential direction of the vane in the corresponding vane chamber. An advance chamber is provided in an area of the vane chamber in the circumferential direction, and a retard chamber is provided in an another area of the vane chamber in the circumferential direction. When the hydraulic pressure in the advance chamber is higher than in the retard chamber, the vane rotor rotates in one direction to enter the advance state; and when the hydraulic pressure in the retard chamber is higher than in the advance chamber, the vane rotor rotates in the other direction to enter the retard state.

BRIEF DESCRIPTION OF DRAWINGS

The above and other objectives, features and advantages of the present disclosure will become more apparent from the following detailed description with reference to the accompanying drawings. In the drawings.

DETAILED DESCRIPTION

Figure 1:
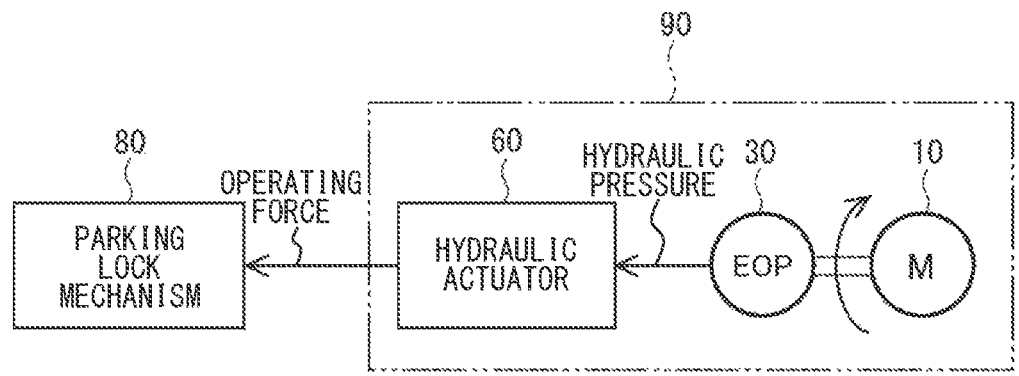
FIG. 1 is a basic configuration diagram illustrating an integrated pump device according to the present embodiment.

To begin with, examples of relevant techniques will be described.

A hydraulic system integrating a motor, an electric oil pump, and a hydraulic actuator is known. A hydraulic system for an automobile according to a comparative example, a motor, an electric oil pump, a hydraulic parking lock actuator, and a clutch-engagement control oil passage are integrated. When the motor rotates in a forward direction, the hydraulic parking lock actuator and a clutch operate. When the motor rotates in a reverse direction, an oil for cooling a motor generator is supplied from the oil pump.

In the hydraulic system, a cylinder-type hydraulic parking lock actuator in which a piston reciprocates in a cylinder is used. Therefore, a body size for securing a pressure receiving area and a stroke length increases.

In contrast to the comparative example, according to an integrated pump device of the present disclosure, the integrated pump device in which a hydraulic actuator integrated with a motor and an electric oil pump can be downsized.

An integrated pump device of the present disclosure is a module in which a motor, an oil pump, and a hydraulic actuator are integrated with each other. For example, in a case of the integrated pump device mounted on an automobile, the term "a module" does not necessarily mean a unit which is delivered to an automobile manufacturer as one component. The term "a module" may be interpreted as what are delivered in parts and integrated into the automobile after being installed in the automobile.

The oil pump discharges oil drawn from an oil pan by a driving force of the motor. The hydraulic actuator switches between an advance state and a retard state by a hydraulic pressure created by the oil pump. For example, the hydraulic actuator is a parking lock actuator which operates a parking lock mechanism of an automobile.

The hydraulic actuator includes a housing having one or more vane chambers, and a vane rotor housed in the housing and including on one or more vanes arranged in the vane chambers.

The vane is capable of rotating in a circumferential direction of the vane in the corresponding vane chamber. An advance chamber is provided in an area of the vane chamber in the circumferential direction, and a retard chamber is provided in an another area of the vane chamber in the circumferential direction. When the hydraulic pressure in the advance chamber is higher than in the retard chamber, the vane rotor rotates in one direction to enter the advance state; and when the hydraulic pressure in the retard chamber is higher than in the advance chamber, the vane rotor rotates in the other direction to enter the retard state.

The operating force of a hydraulic actuator is determined by the product of the pressure receiving area and the hydraulic pressure. In the present disclosure, by using a rotary hydraulic actuator, the pressure receiving area can be secured by one or more vanes, and the size of the hydraulic actuator can be reduced. Therefore, the hydraulic actuator is particularly effectively applied such as a parking lock actuator where the mounting space is restricted.

The details of one or more embodiments are set forth in the accompanying drawings and the description below. Other features and advantages will be apparent from the description and drawings, and from the claims.

An integrated pump device according to the present disclosure will be described with reference to plural embodiments based on the drawings. In the multiple embodiments, substantially the same components are denoted by the same reference numerals, and a description of the same components will be omitted. The following first to sixth embodiments are collectively referred to as "present embodiment". The integrated pump device of the present embodiment is a module in which a motor, an electric oil pump, and a hydraulic actuator are configured to be integrated.

FIG. 1 is a basic configuration diagram illustrating an integrated pump device 90 of the present embodiment. The integrated pump device 90 is integrally configured by the motor 10, the oil pump 30, and the hydraulic actuator 60. In FIG. 1, the motor is denoted by "M" and the electric oil pump by "EOP".

The oil pump 30 is an electric oil pump and discharges oil drawn from an oil pan by a driving force of the motor 10.

The hydraulic actuator 60 switches between an advance state and a retard state by a hydraulic pressure created by the oil pump 30. Here, "advance state" and "retard state" are merely terms for distinguishing opposite states for convenience, and either state may be defined as the advance state or the retard state.

The hydraulic actuator 60 of the present embodiment is a parking lock actuator which operates a parking lock mechanism 80 of an automobile. The hydraulic actuator 60 provides an actuating force to the parking lock mechanism 80 such that the hydraulic actuator 60 locks the parking lock mechanism 80 at the advance state and unlocks the parking lock mechanism 80 at the retard state. When a shift range is operated to a P range, it corresponds to the time of being locked, and when the shift range is operated to a not-P range (i.e., notP range), it corresponds to the time of being unlocked. Here, the not-P range is one range in the two-position configuration. In addition, in a configuration including a multi-shift range, a plurality of ranges other than the P range may be collectively interpreted as the not-P range.

First Embodiment

Figure 2:
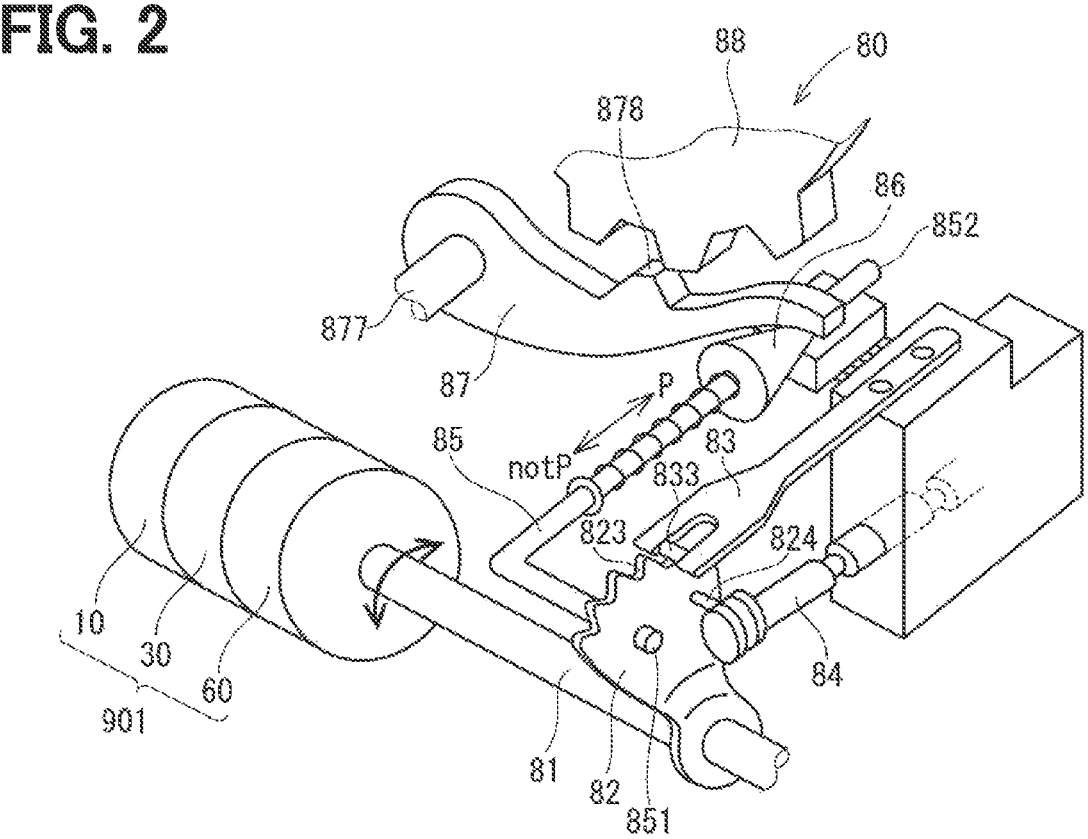
FIG. 2 is a configuration diagram illustrating the integrated pump device and a parking lock mechanism according to first to sixth embodiments.

Hereinafter, the reference numerals of the integrated pump device of first to sixth embodiments are "901" to "906" corresponding to the respective embodiments. Firstly, the first embodiment will be described with reference to FIG. 2 to FIG. 6. FIG. 2 is a configuration diagram illustrating the integrated pump device 901 and the parking lock mechanism 80 of the first embodiment. The integrated pump device 901 includes the hydraulic actuator 60 of a rotary type having a cylindrical outer shape. The integrated pump device 901 is integrally formed by the motor 10, the oil pump 30, and the hydraulic actuator 60. In FIG. 2, the motor 10, the oil pump 30, and the hydraulic actuator 60 are arranged coaxially and in series and integrally constructed, but they may be arranged in series and integrally constructed with their axes shifted, or may be arranged in parallel and integrally constructed.

The parking lock mechanism 80 includes a detent shaft 81, a detent plate 82, a detent spring 83, a switching rod 84, a parking rod 85, a cone 86, a parking lock pole 87, and a parking gear 88. The detent shaft 81 is an output shaft of the hydraulic actuator 60, and rotates in both directions within a predetermined angular range when the hydraulic actuator 60 is operated. The detent plate 82 is fixed to the detent shaft 81 and rotates together with the detent shaft 81.

The detent plate 82 has recesses 823 at portions close to the detent spring 83. When a rotational force greater than or equal to a predetermined amount is applied to the detent plate 82, the detent spring 83 is elastically deformed, and a detent roller 833 provided at a tip is fitted into one of the recesses 823. As a result, a rotation of the detent plate 82 is restricted. A pin 824 protruding from a plate surface of the detent plate 82 engages with a groove formed at a tip of the switching rod 84. Note that the pin 824 and the switching rod 84 in the reference embodiment shown in FIG. 19 may be used, or may not be used in the first embodiment.

The parking rod 85 is formed in a substantially L-shape, and one end 851 is fixed to the detent plate 82. The other end 852 of the parking rod 85 is provided at the cone 86. The cone 86 is formed so as to decrease in diameter as toward the other end 852. When the detent plate 82 rotates in a direction in which the detent roller 833 fits into a recess corresponding to the P range, the cone 86 moves in the direction of an arrow P in FIG. 2.

The parking lock pole 87 is in contact with a conical surface of the cone 86 and is provided so as to be swingable around a shaft part 877. A protrusion 878 that can mesh with the parking gear 88 is provided on the parking lock pole 87.

When the cone 86 moves in the direction of the arrow P, the parking lock pole 87 is pushed up and the protrusion 878 and the parking gear 88 mesh with each other. As a result, the parking lock pole 87 is in a locked state. On the other hand, when the cone 86 moves in a direction of an arrow notP, the meshing between the protrusion 878 and the parking gear 88 is released. As a result, the parking lock pole 87 is in an unlocked state.

Figure 3:
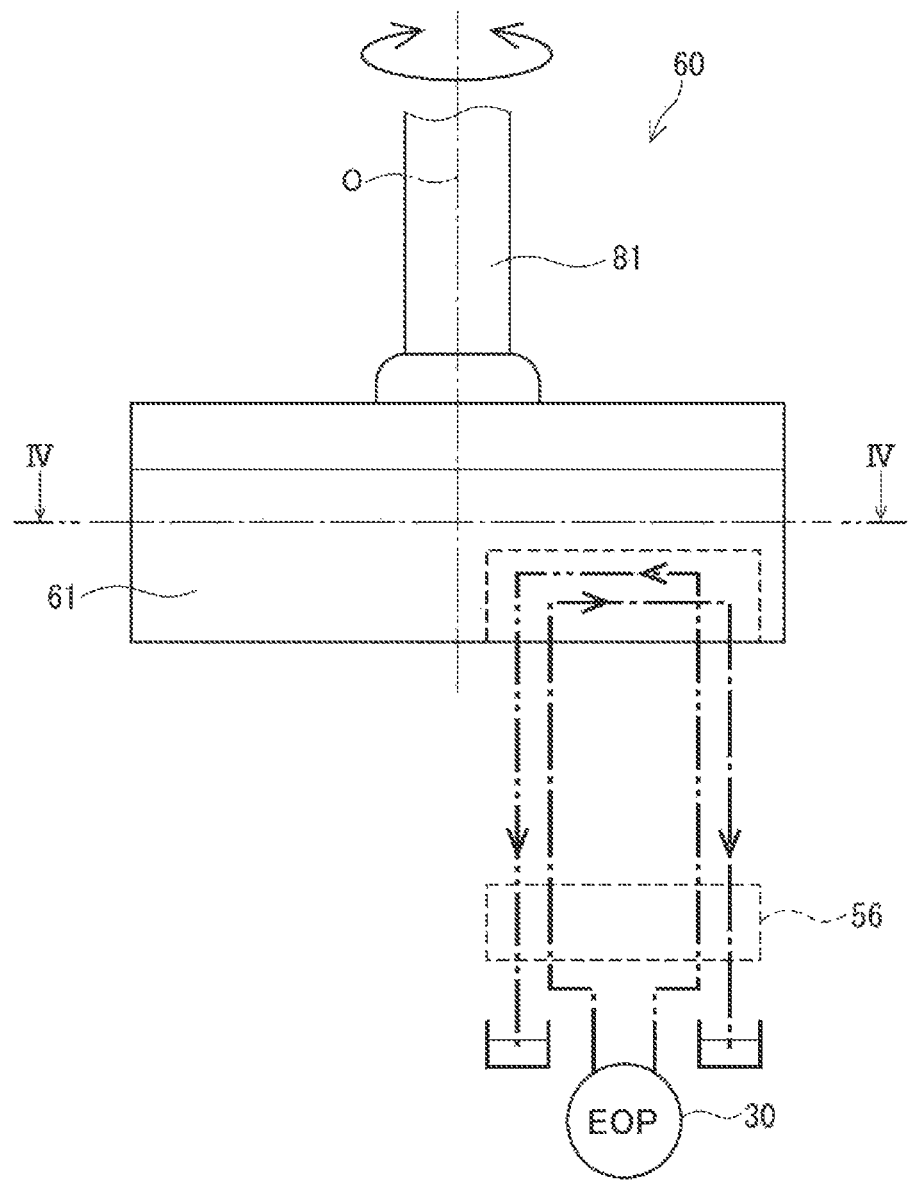
FIG. 3 is a diagram illustrating an appearance of a rotary hydraulic actuator and a flow of oil according to the first, third and fifth embodiments.
Figure 4:
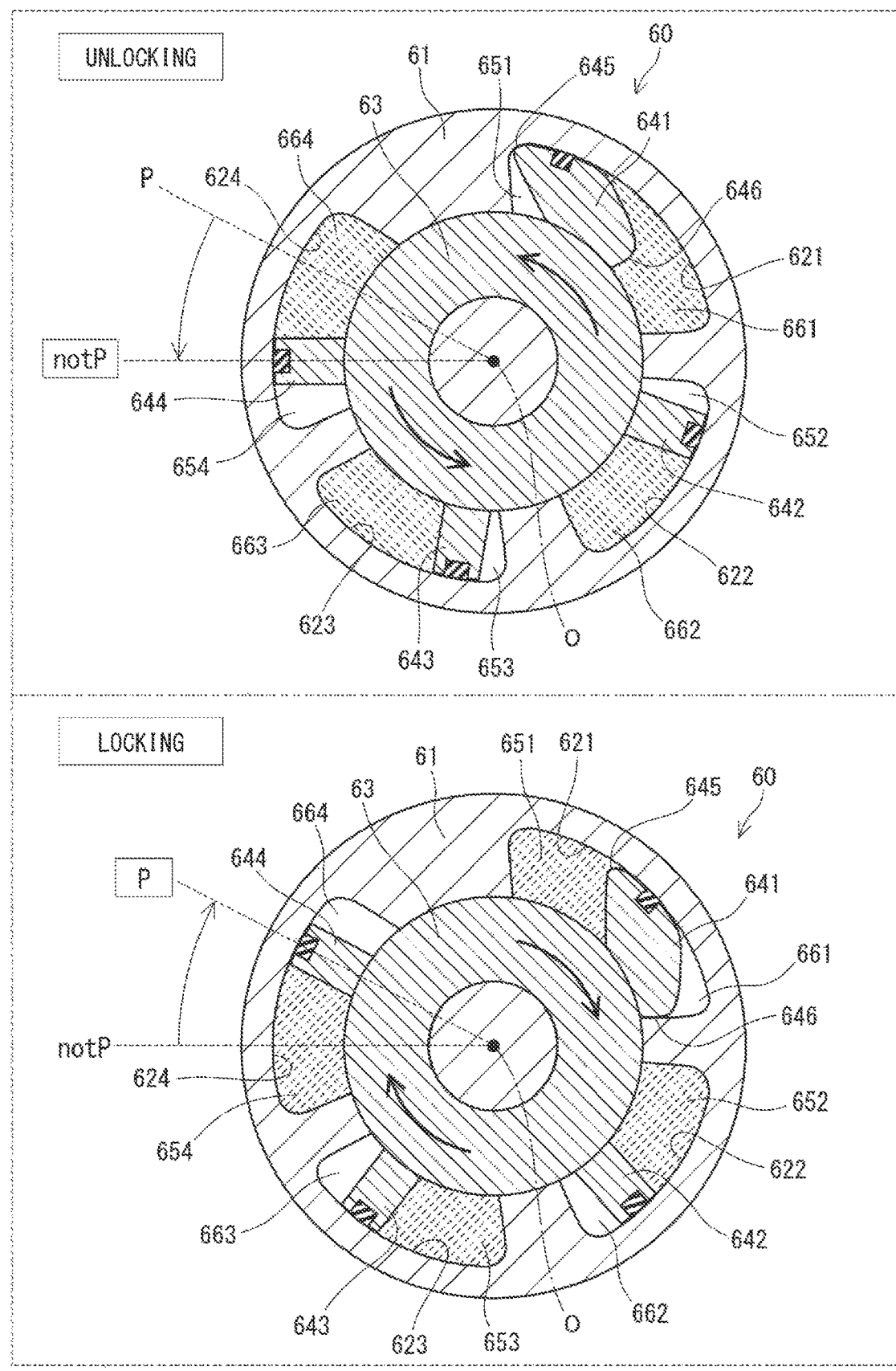
FIG. 4 is a cross-sectional view taken along line IV-IV of FIG. 3 at the time of being unlocked (retard state) and locked (advance state) of the first, third, and fifth embodiments.

Next, a configuration example of the rotary hydraulic actuator 60 will be described with reference to FIGS. 3 and 4. The configurations of FIGS. 3 and 4 are also common in third and fifth embodiments described later. The upper part of FIG. 4 shows an operation completion state at the time of being unlocked when the shift range is operated from the P range to the not-P range. The lower part of FIG. 4 shows the operation completion state at the time of being locked when the shift range is operated from the not-P range to the P range.

The hydraulic actuator 60 includes a housing 61 having a cylindrical centered on a rotation axis O and a vane rotor 63 coaxially accommodated in the housing 61. The housing 61 has, for example, four vane chambers 621 to 624 arranged in the circumferential direction. The vane chambers 621 to 624 are fan-shaped with radially outside inner walls each formed in an arc shape. In FIG. 4, lead wires of reference numerals of the vane chambers 621 to 624 are led out from the radially outside inner wall.

The vane rotor 63 has four vanes 641 to 644, for example. The four vanes 641 to 644 are provided on an outer periphery of the vane rotor 63 respectively corresponding to the vane chambers 621 to 624. One vane 641 of the four vanes 641 to 644 includes stoppers 645, 646 provided at both ends in the circumferential direction for restricting a rotation of the vane 641, and is formed larger than the other three vanes 642, 643, 644. The other three vanes 642, 643, 644 are formed relatively small in order to secure a volume of a hydraulic chamber. A sealing material is provided on a sliding portion of a radial outer wall of each of the vanes 641 to 644.

The vanes 641 to 644 are capable of rotating in a circumferential direction in the corresponding vane chambers 621 to 624. Advance chambers 651 to 654 are formed in one circumferential direction of the vanes 641 to 644 in the vane chambers 621 to 624, respectively. Retard chambers 661 to 664 are formed in the other circumferential direction of the vanes 641 to 644. Although not shown, the advance chambers 651 to 654 are connected to a common advance port via distribution oil passages. Similarly, the retard chambers 661 to 664 are connected to a common return port via the distribution oil passages.

Hydraulic pressure is supplied to the retard chambers 661 to 664 hatched with dashed lines at the time of being unlocked shown in the upper part of FIG. 4. As a result, the vane rotor 63 rotates in a counterclockwise direction in the FIG. 4 to the retard state, and the parking lock mechanism 80 is unlocked. The Oil is discharged from the advance chambers 651 to 654. A two-dot chain line arrow in FIG. 3 schematically indicates a flow of the oil at this time.

The hydraulic pressure is supplied to the advance chambers 651 to 654 hatched with dashed lines at the time of being locked shown in the lower part of FIG. 4. As a result, the vane rotor 63 rotates in a clockwise direction in the FIG. 4 to be in the advance state, and the parking lock mechanism 80 is locked. The oil is discharged from the retard chambers 661 to 664. The dashed-dotted arrows in FIG. 3 schematically indicates the flow of the oil at this time.

Figure 5:
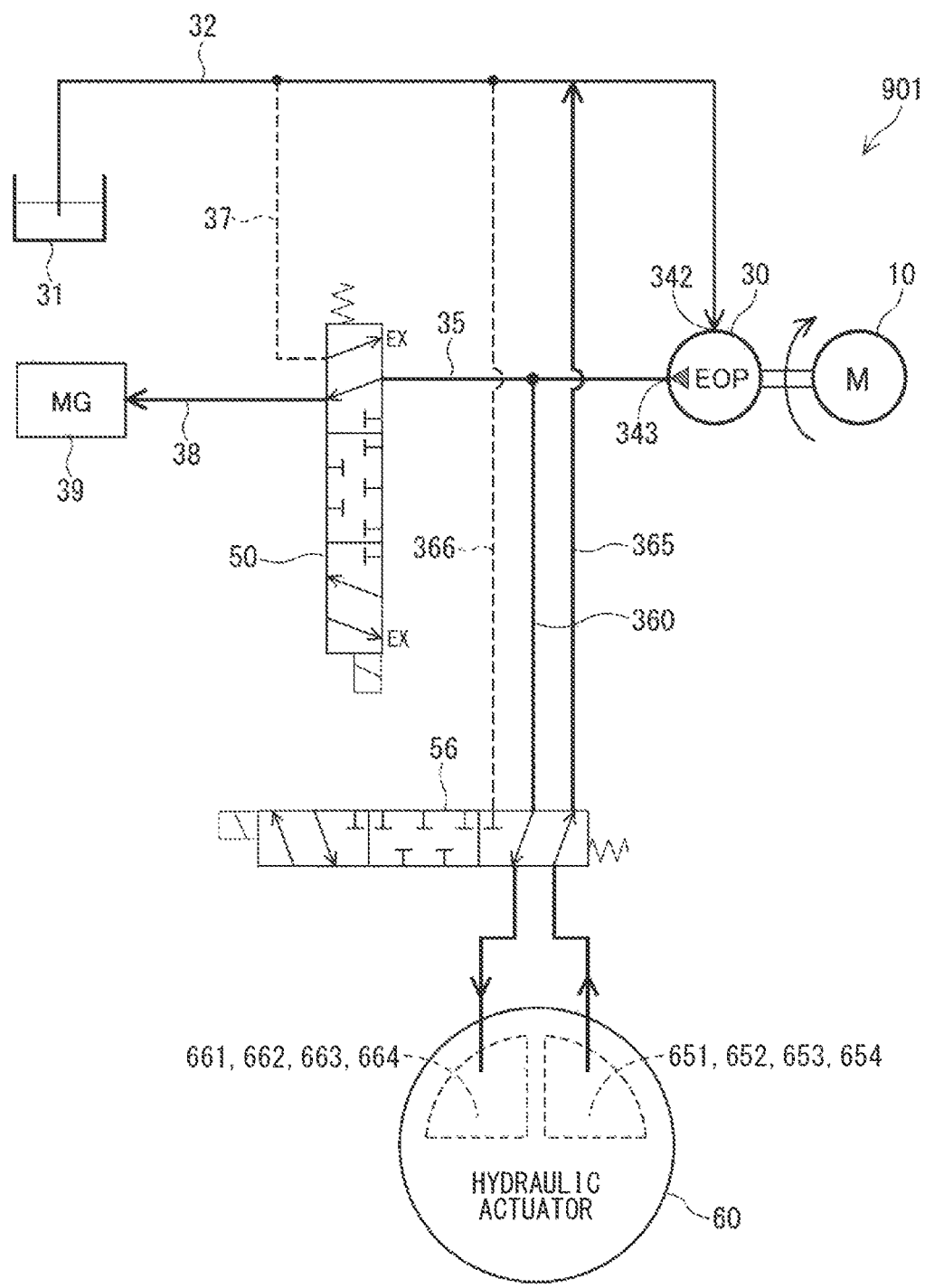
FIG. 5 is a diagram showing a hydraulic path at the time of being unlocked (retard state) according to the first embodiment.
Figure 6:
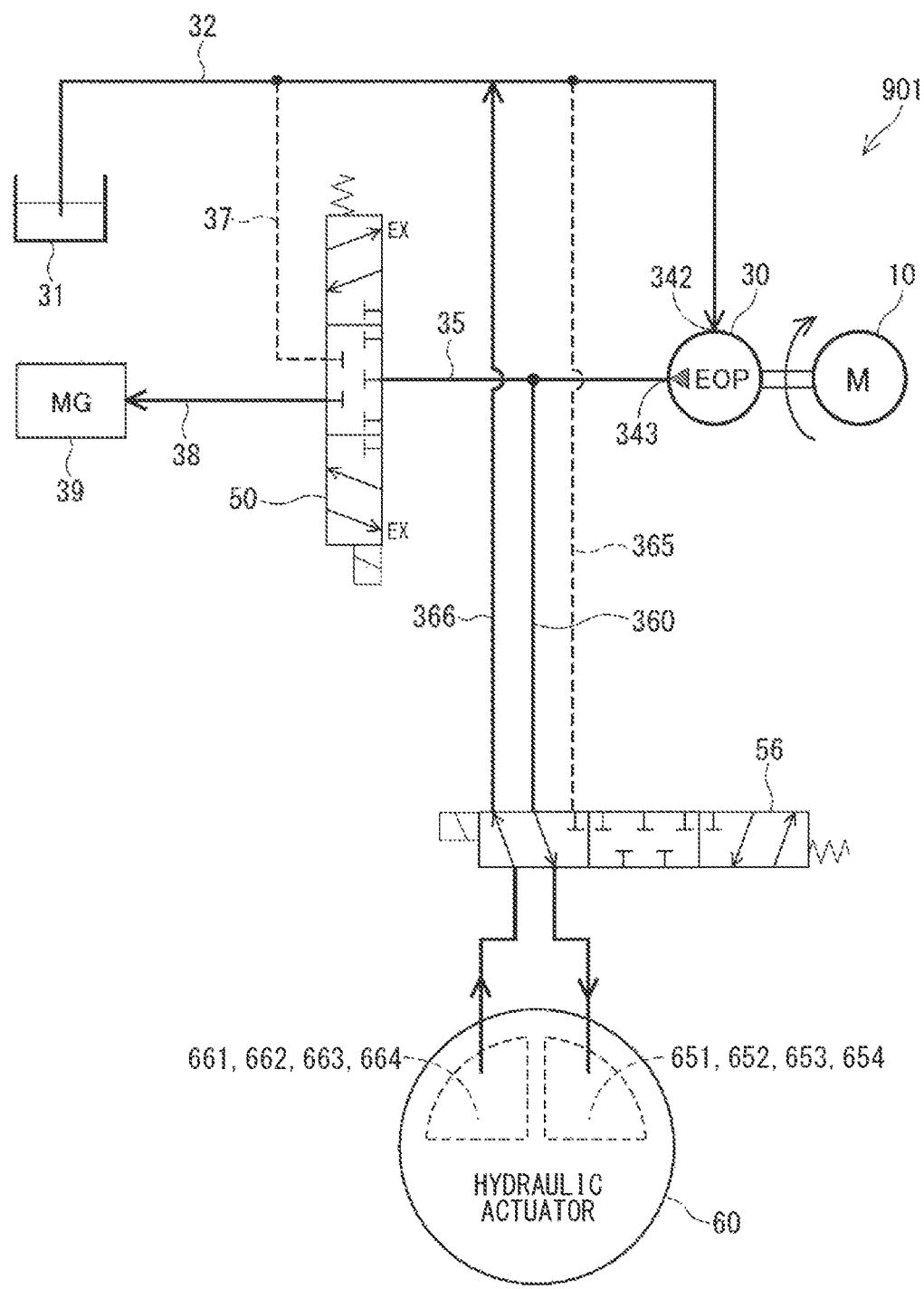
FIG. 6 is a diagram showing a hydraulic path at the time of being unlocked (advance state) according to the first embodiment.

Next, reference is made to FIGS. 5 and 6. The oil pump 30 is connected to a motor generator 39 via direct supply passages 35, 38 branched from an oil passage that supplies the hydraulic pressure to the hydraulic actuator 60. The motor generator is denoted as "MG" in the drawings and the following specification. The MG 39 corresponds to an oil consumption device to which the oil is supplied from the oil pump 30. More specifically, in a stator of the MG 39, the oil is sprayed in an open space so as to cool coils that generate heat when the MG 39 is energized.

The following first to sixth embodiments are a combination of three patterns of configuration regarding switching of an operating direction of the hydraulic actuator 60 and two patterns of configuration regarding an oil supply route to the MG 39. Regarding the switching of the operating direction of the hydraulic actuator 60, in the first and second embodiments, a rotation direction of the oil pump 30 is constant, and the oil drawn from the oil pan 31 via a suction oil passage 32 flows through a suction port 342 to a discharge port 343 only in one direction.

A directional control valve 56 is provided between the oil pump 30 and the hydraulic actuator 60 to switch a flow of the oil from the oil pump 30 to the advance chambers 651 to 654 and the retard chambers 661 to 664. Of three inlet ports of the directional control valve 56, a port shown in the middle is connected to the discharge port 343 of the oil pump 30 via an actuator oil passage 360. Of the three inlet ports, two ports shown on two sides are connected to the suction oil passage 32 via actuator oil passages 365, 366, respectively.

Further, with respect to an oil supply route to the MG 39, in the first, third, and fifth embodiments, a supply switching valve 50 for switching between communication and blocking of direct supply passages 35, 38 are provided in the direct supply passages 35, 38. One of the direct supply passages 35, 38, positioned on a side of the oil pump 30, that is, at an upstream side of the supply switching valve 50 is referred to as the "discharge oil passage 35". The other one of the direct supply passages 35, 38, positioned on a side of the MG 39 from the supply switching valve 50, that is, at a downstream side of the supply switching valve 50, is referred to as "arrival oil passage 38". In the first, third, and fifth embodiments, the use of a circulation oil passage 37 indicated by the dashed line between the supply switching valve 50 and the suction oil passage 32 is basically not assumed. That is, the lowest mode among the three switching modes that constitute the supply switching valve 50 may not be used. The discharge oil passage 35 communicates with or is blocked from the arrival oil passage 38. The supply switching valve 50 may be configured integrally as a module of the integrated pump device 901.

At the time of being unlocked as shown in FIG. 5, the supply switching valve 50 is operated to a position where the direct supply passages 35, 38 communicate with each other. The directional control valve 56 is operated to a position where the actuator oil passage 360 is connected to the retard chambers 661 to 664 and the actuator oil passage 365 is connected to the advance chambers 651 to 654. The oil discharged from the discharge port 343 of the oil pump 30 is supplied to the MG 39 via the direct supply passages 35, 38, and is also supplied to the retard chambers 661 to 664 of the hydraulic actuator 60 via the actuator oil passage 360. In addition, the oil is returned to the suction oil passage 32 from the advance chambers 651 to 654 of the hydraulic actuator 60 via the actuator oil passage 365. Thus, the hydraulic actuator 60 becomes in the retard state, and the parking lock mechanism 80 is unlocked.

At the time of being locked as shown in FIG. 6, the supply switching valve 50 is operated to a position where the direct supply passages 35, 38 are cut off. The directional control valve 56 is operated to a position where the actuator oil passage 360 is connected to the advance chambers 651 to 654 and the actuator oil passage 366 is connected to the retard chambers 661 to 664. The oil discharged from the discharge port 343 of the oil pump 30 is supplied to the advance chambers 651 to 654 of the hydraulic actuator 60 via the actuator oil passage 360. In addition, the oil is returned to the suction oil passage 32 from the retard chambers 661 to 664 of the hydraulic actuator 60 via the actuator oil passage 366. Thus, the hydraulic actuator 60 becomes in the advance state, and the parking lock mechanism 80 is locked.

The operating force of the hydraulic actuator is determined by a product of a pressure receiving area and a hydraulic pressure. By using the rotary hydraulic actuator 60, the pressure receiving area can be secured by the plurality of vanes 641 to 644, and the hydraulic actuator 60 can be downsized. Therefore, the hydraulic actuator is particularly effectively applied such as a parking lock actuator where the mounting space is restricted. Those advantages are common in the first to sixth embodiments.

In the first embodiment, the switching of the operation direction of the hydraulic actuator 60 can be reliably performed by using the directional control valve 56. In addition, in the first embodiment, with respect to the oil supply route to the MG 39, the supply switching valve 50 provided in the direct supply passages 35, 38 is used. Thus, the supply of cooling oil to the MG 39 can be switched at any timing since the MG 39 can be performed independently of the operation of the hydraulic actuator 60.

Second Embodiment

A second embodiment will be described with reference to FIGS. 7 to 10. An integrated pump device 902 of the second embodiment differs from the first embodiment in a route for supplying oil to a MG 39 as an oil consumption device. In the second embodiment, there are no direct supply passages 35, 38 between an oil pump 30 and the MG 39 as in the first embodiment. Further, in the second embodiment, a supply switching valve 50 is not provided.

Figure 7:
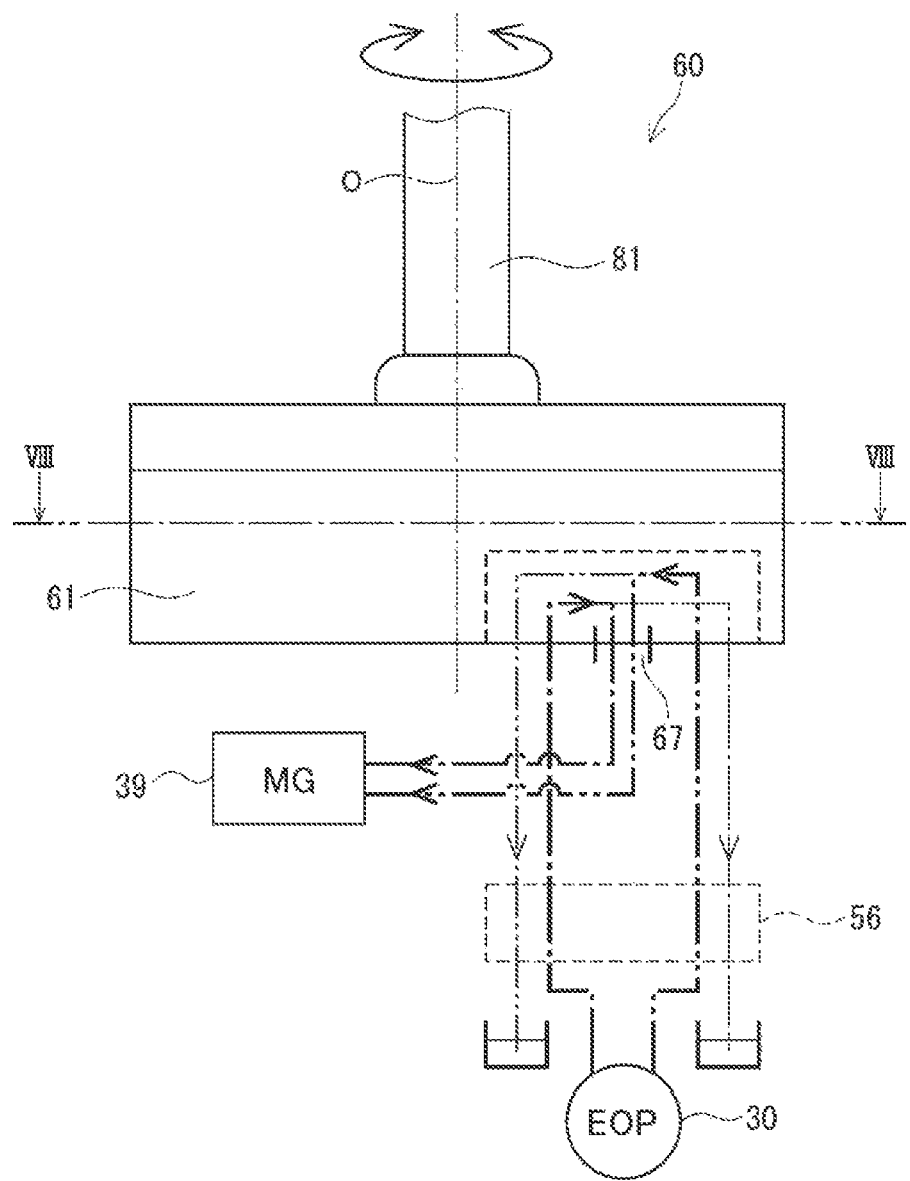
FIG. 7 is a diagram illustrating an appearance of a rotary hydraulic actuator and a flow of oil according to the second, fourth and sixth embodiments.
Figure 8:
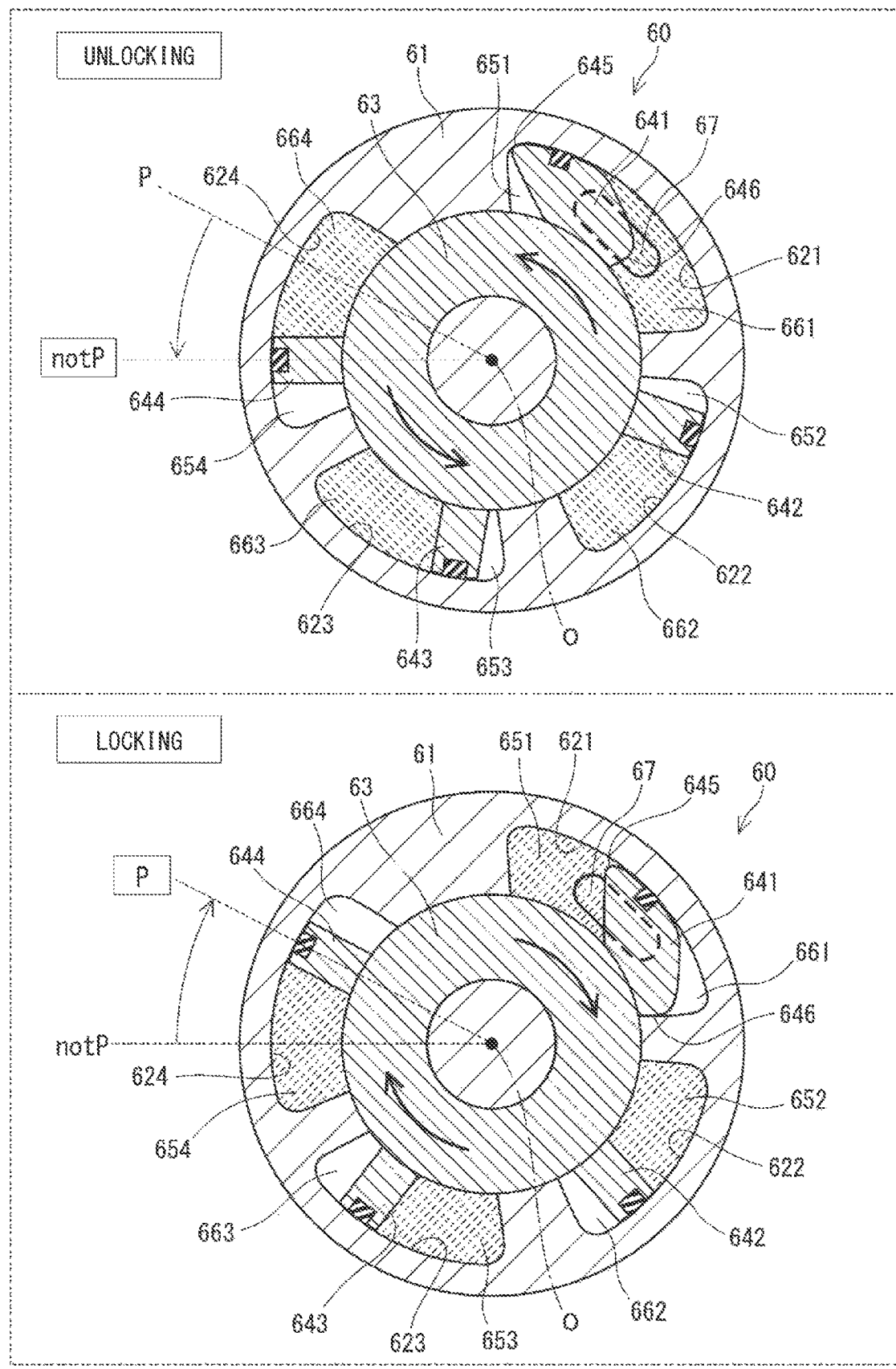
FIG. 8 is a cross-sectional view taken along line VIII-V III of FIG. 7 at the time of being unlocked (retard state) and locked (advance state) of the second, fourth, and sixth embodiments.

Next, a configuration example of a rotary hydraulic actuator 60 of the second embodiment will be described with reference to FIGS. 7 and 8. The configurations of FIGS. 7 and 8 are also common in fourth and sixth embodiments described later. FIGS. 7 and 8 correspond to FIGS. 3 and 4 of the first embodiment, respectively. As shown in FIG. 8, a vane chamber 621 in which a vane 641 operates, for example, has a communication port 67 formed in a middle part in a rotation direction between an advance chamber 651 and a retard chamber 661. The communication port 67 may be formed not only in one vane chamber 621 but also in a plurality of vane chambers.

Figure 9:
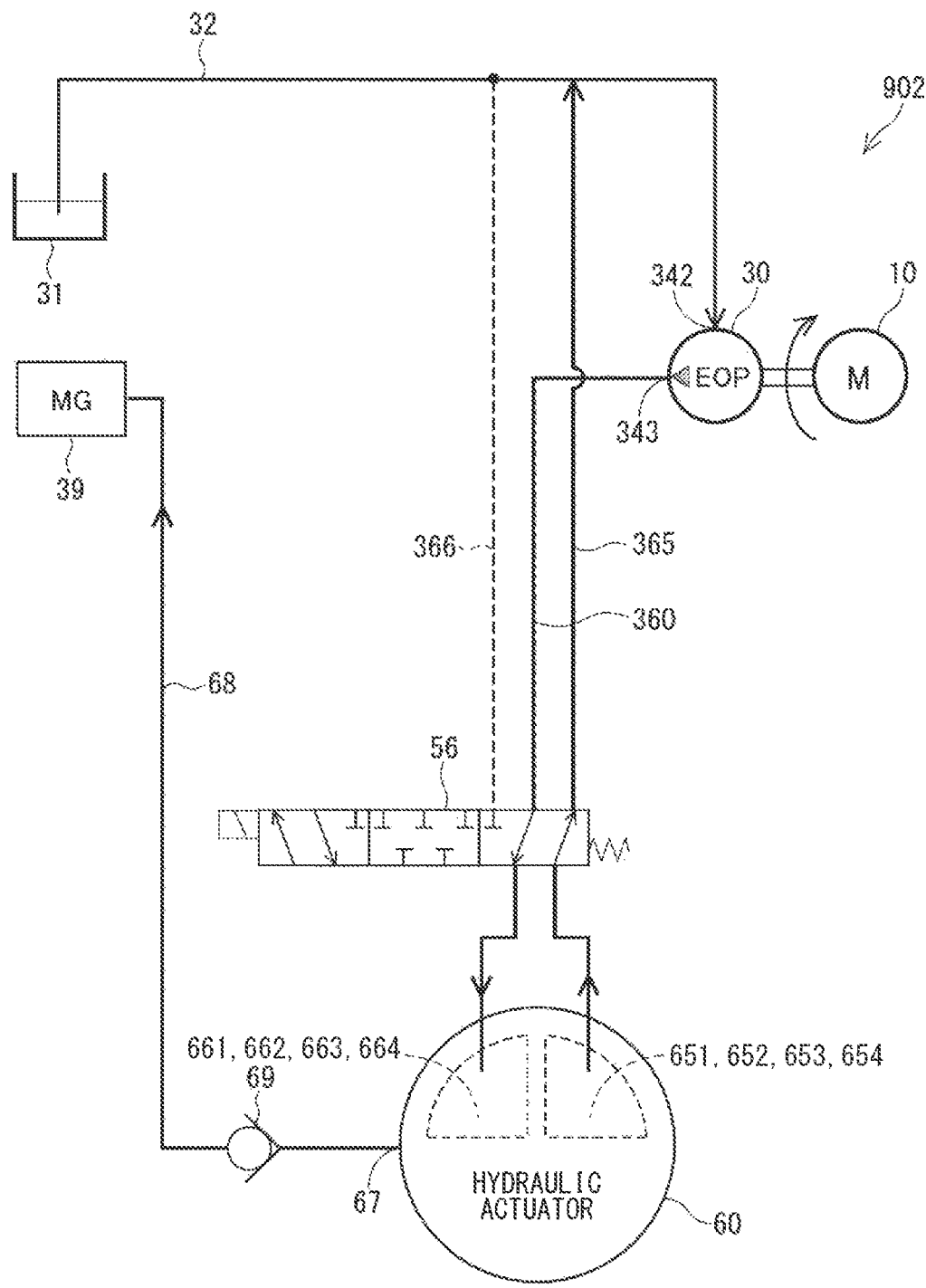
FIG. 9 is a diagram showing a hydraulic path at the time of being unlocked (retard state) according to the second embodiment.
Figure 10:
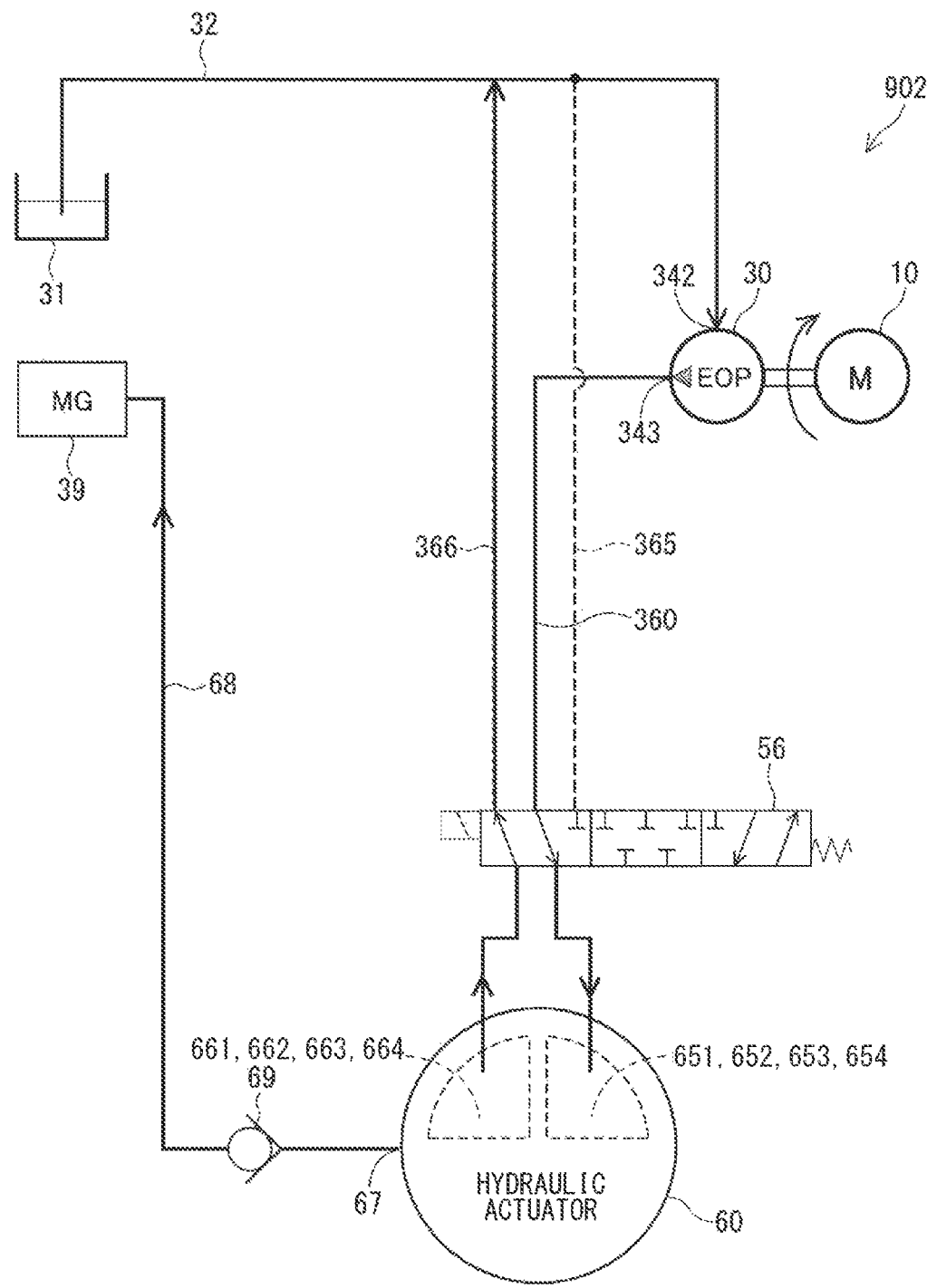
FIG. 10 is a diagram showing a hydraulic path at the time of being locked (advance state) according to the second embodiment.

As shown in FIGS. 9 and 10, the communication port 67 is connected to the MG 39 via a sub-supply passage 68. A consumption check valve 69 is provided at the sub-supply passage 68 and prevents a reverse flow of the oil from the MG 39 to the hydraulic actuator 60. The consumption check valve 69 is not limited to one, and a plurality of consumption check valves may be provided.

Here, an unlocked state shown on the upper part of FIG. 8 is an initial state of rotation of the vane rotor 63 at the time of being locked. A locked state shown on the lower part of FIG. 8 is the initial state of rotation of the vane rotor 63 at the time of being unlocked. A two-dot chain line arrow in FIG. 7 schematically indicates a flow of the oil when shifting from a locked state to an unlocked state. A dashed-dotted line arrow schematically indicates the flow of oil when shifting from the unlocked state to the locked state.

At an initial stage of rotation of the vane rotor 63 shown in FIG. 9, the vane 641 closes the communication port 67 in the hydraulic chamber which is the retard chamber 661, to which hydraulic pressure is supplied from the oil pump 30. After the vane rotor 63 starts rotating, the communication port 67 is opened in the retard chamber 661 at a certain rotational position. Then, at least part of the oil supplied from the oil pump 30 to the retard chamber 661 flows out from the communication port 67 and is supplied to the MG 39 via the sub-supply passage 68.

At the time of being locked as shown FIG. 10, at the initial stage of rotation of the vane rotor 63, the vane 641 closes the communication port 67 in the hydraulic chamber, which is the advance chamber 651, to which the hydraulic pressure is supplied from the oil pump 30. After the vane rotor 63 starts rotating, the communication port 67 is opened in the advance chamber 651 at a certain rotational position. Then, at least part of the oil supplied from the oil pump 30 to the advance chamber 651 flows out from the communication port 67 and is supplied to the MG 39 via the sub-supply passage 68.

In the first embodiment, the oil passage from the oil pump 30 to the MG 39 and the oil passage from the oil pump 30 to the hydraulic actuator 60 are provided in parallel. In contrast, in the second embodiment, the oil passages are provided in series so as to connect the oil pump 30 to the MG 39 via the hydraulic actuator 60. By combining them into one route, the configuration of the oil passage can be simplified. Also, by switching the oil supply to the MG 39 using a rotation of the vane rotor 63, the supply switching valve 50 may be omitted. Therefore, a system including the integrated pumping device can be made more compact.

Third Embodiment

A third embodiment will be described with reference to FIGS. 11 and 12. An integrated pump device 903 of the third embodiment differs from the first embodiment in a configuration of a hydraulic circuit for switching an operating direction of a hydraulic actuator 60. An oil pump 30 can rotate in both a forward direction and a reverse direction together with rotation of a motor 10, and a suction port and a discharge port are alternatively switched in accordance with a change of a rotation direction of the oil pump 30. That is, a forward suction port 342 is a reverse discharge port, and a reverse suction port 343 is a forward discharge port.

Figure 11:
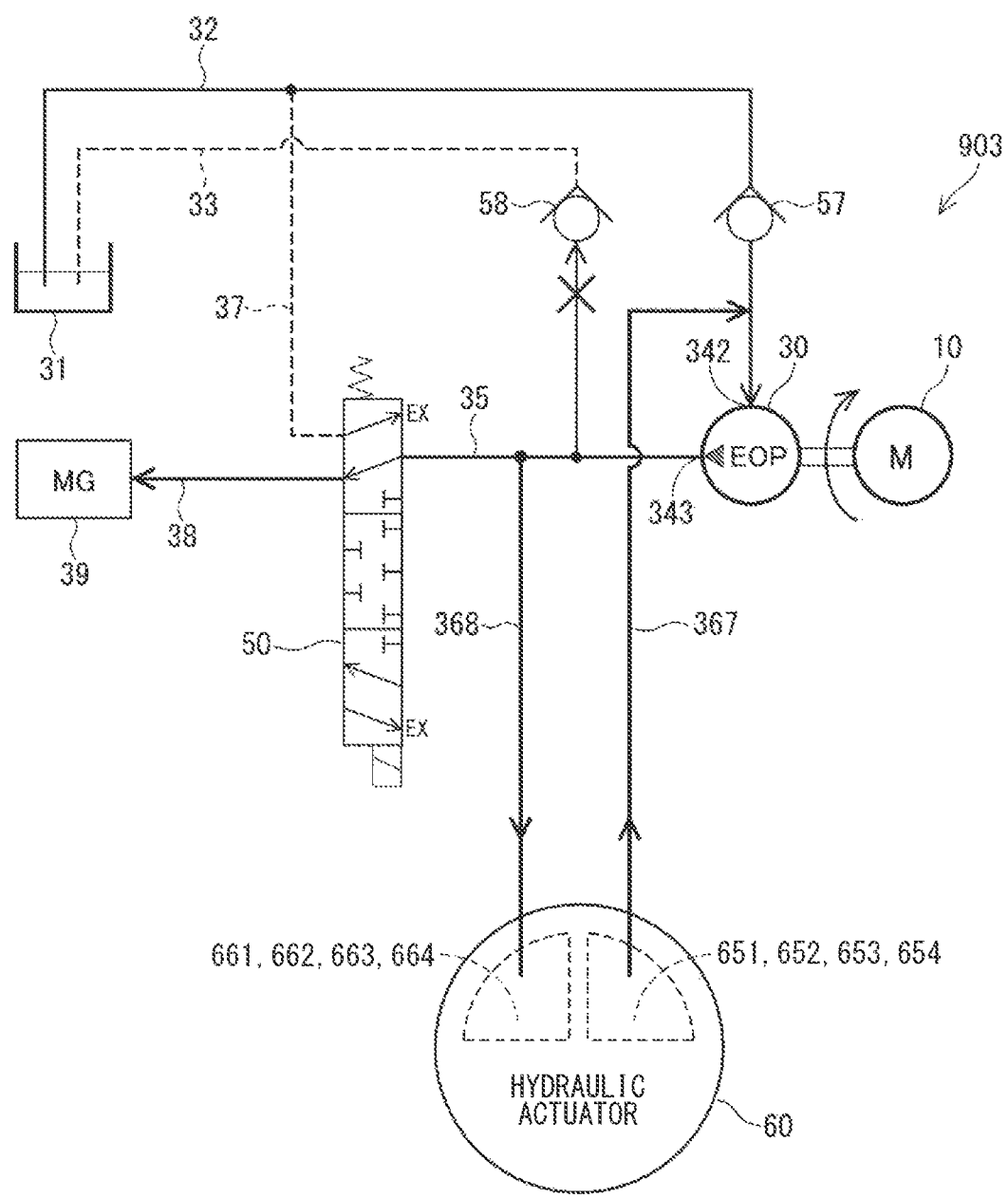
FIG. 11 is a diagram showing a hydraulic path at the time of being unlocked (retard state) according to the third embodiment.
Figure 12:
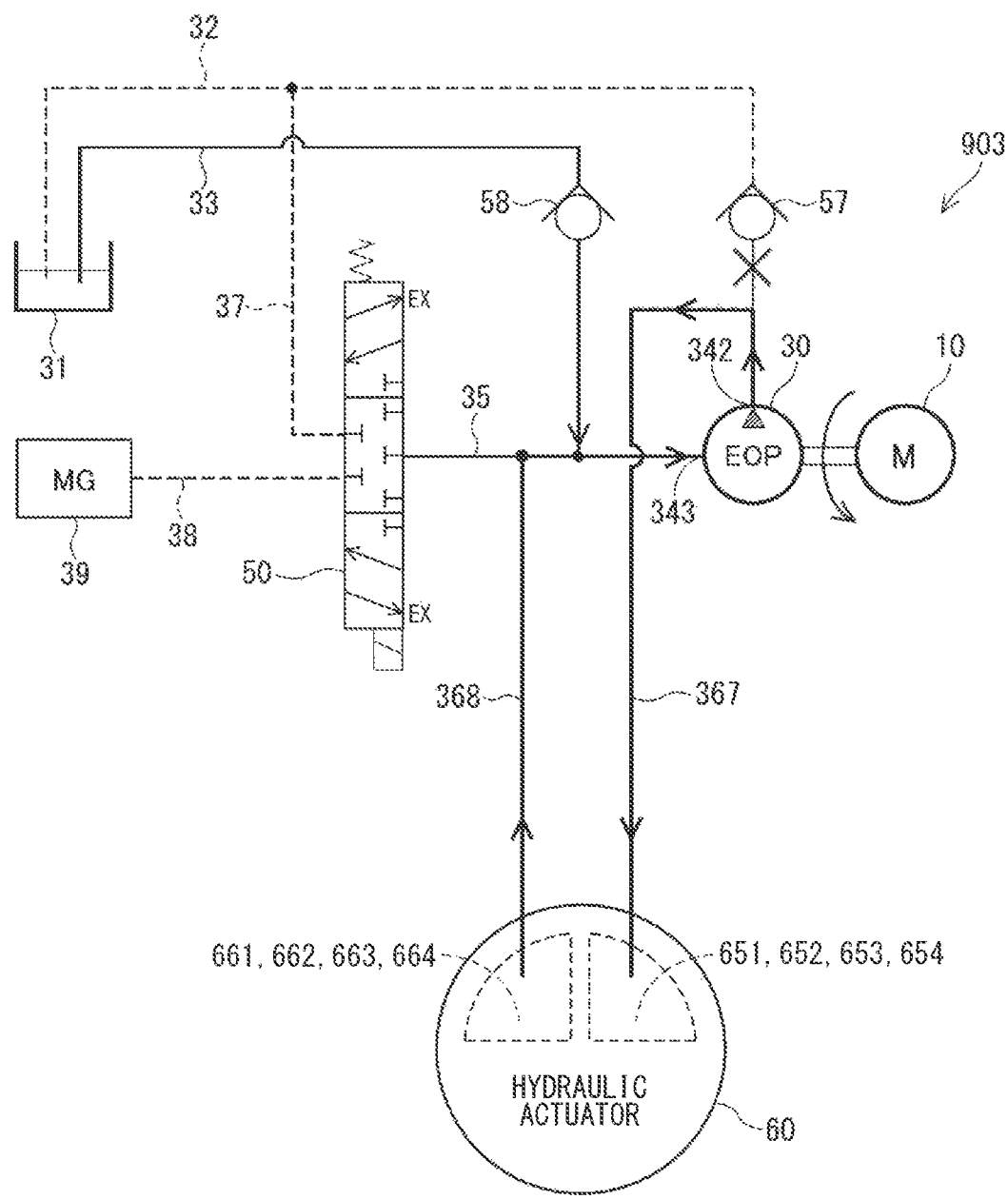
FIG. 12 is a diagram showing a hydraulic path at the time of being locked (advance state) according to the third embodiment.

In FIGS. 11 and 12, for convenience, a rotation direction of the first embodiment, that is, the rotation direction of the oil pump 30 in which oil is supplied to the MG 39 directly from the forward discharge port 343 via the direct supply passages 35, 38 is a forward direction. The supply switching valve 50 switches between communication and blocking of the direct supply passages 35, 38 similarly to the first embodiment.

The forward suction port 342 is connected to advance chambers 651 to 654 of the hydraulic actuator 60 via an actuator oil passage 367. The forward suction passage 32 connected to the forward suction port 342 is provided with a suction check valve 57 that prevents a reverse flow from the oil pump 30 to the oil pan 31.

The reverse suction port 343 is connected to the retard chambers 661 to 664 of the hydraulic actuator 60 via an actuator oil passage 368. A suction check valve 58 that prevents a reverse flow from the oil pump 30 to the oil pan 31 is provided at the reverse suction passage 33 connected to the reverse suction port 343. In the FIGS. 11 and 12, one end of each of the forward suction passage 32 and the reverse suction passage 33 is connected to the oil pan 31. Alternatively, the forward suction passage 32 and the reverse suction passage 33 may branch from a common suction oil passage connected to the oil pan 31.

At the time of unlocking as shown in FIG. 11, the supply switching valve 50 is operated to a position where the direct supply passages 35, 38 communicate with each other. When the oil pump 30 rotates forward, the oil is drawn from the oil pan 31 into the forward suction port 342 via the forward suction passage 32. The oil discharged from the forward discharge port 343 of the oil pump 30 is supplied to the MG 39 via the direct supply passages 35, 38, and is also supplied to the retard chamber 661 to 664 of the hydraulic actuator 60 via the actuator oil passage 368.

At this time, the suction check valve 58 prevents the oil from flowing back to the oil pan 31 through the reverse suction passage 33, as indicated by an "x" mark in FIG. 11. In addition, the oil is returned to the forward suction passage 32 from the advance chambers 651 to 654 of the hydraulic actuator 60 via the actuator oil passage 367. Thus, the hydraulic actuator 60 becomes in the retard state, and the parking lock mechanism 80 is unlocked.

At the time of being locked as shown in FIG. 12, the supply switching valve 50 is operated to a position where the direct supply passages 35, 38 are cut off. When the oil pump 30 reverses, the oil is drawn from the oil pan 31 into the reverse suction port 343 via the reverse suction passage 33. The oil discharged from the reverse discharge port 342 is supplied to the advance chambers 651 to 654 of the hydraulic actuator 60 via the actuator oil passage 367.

At this time, the suction check valve 57 prevents the oil from flowing back to the oil pan 31 through the forward suction passage 32, as indicated by an "x" mark in FIG. 12. In addition, the oil is returned to the reverse suction port 343 from the retard chambers 661 to 664 of the hydraulic actuator 60 via the actuator oil passage 368. Thus, the hydraulic actuator 60 becomes in the advance state, and the parking lock mechanism 80 is locked.

Fourth Embodiment

A fourth embodiment will be described with reference to FIGS. 13 and 14. An integrated pump device 904 of the fourth embodiment combines a configuration for switching an operating direction of a hydraulic actuator 60 according to the third embodiment and a configuration for supplying oil to a MG 39 according to the second embodiment. The operating direction of the hydraulic actuator 60 is switched by switching between forward and reverse rotations of the oil pump 30 and using functions of suction check valves 57, 58. Also, the oil is supplied to the MG 39 from a communication port 67 formed in the hydraulic actuator 60 via a sub-supply passage 68. A consumption check valve 69 is provided in the sub-supply passage 68.

Figure 13:
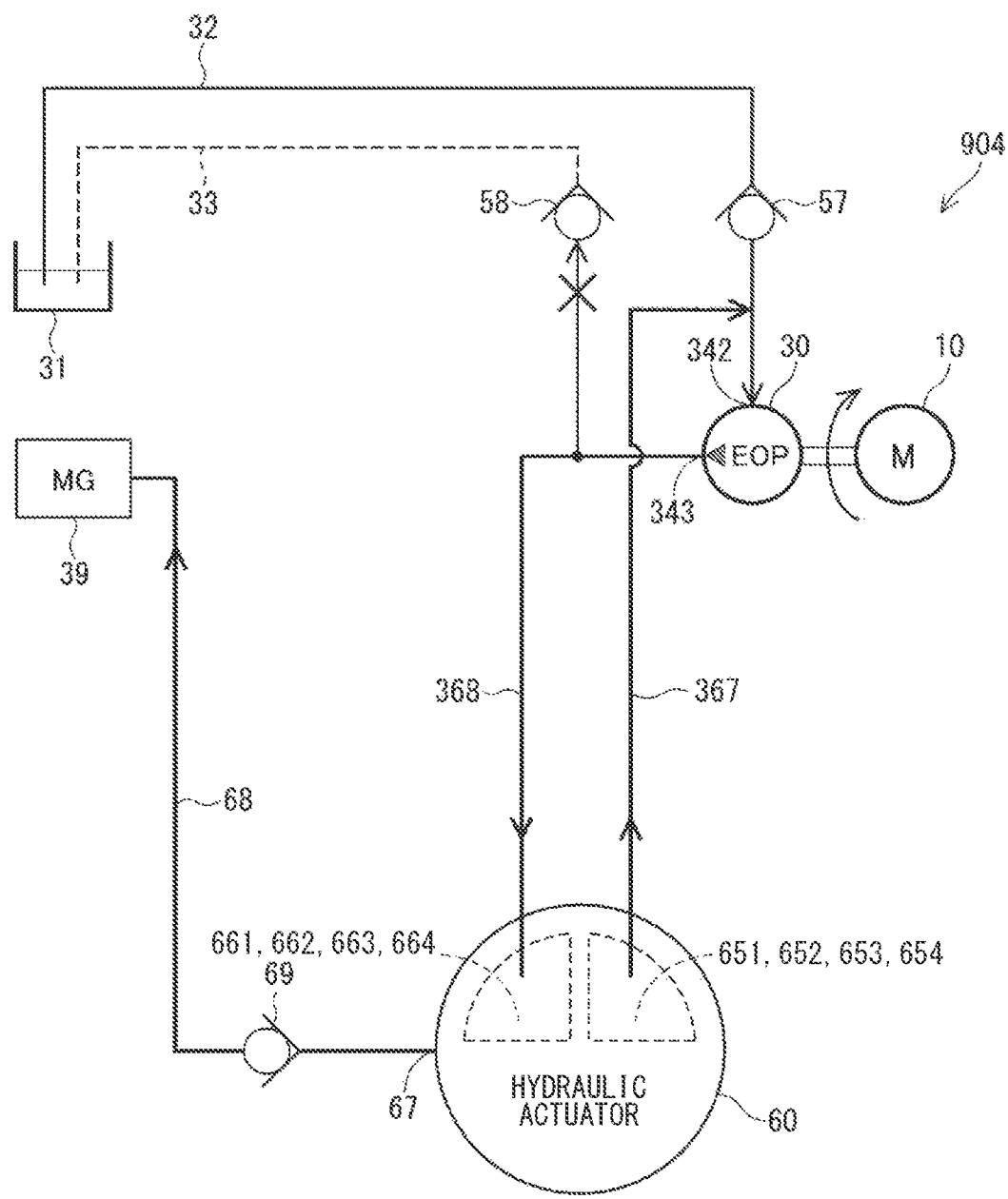
FIG. 13 is a diagram showing a hydraulic path at the time of being unlocked (retard state) according to the fourth embodiment.

At the time of being unlocked as shown in FIG. 13, when the oil pump 30 rotates forward, the oil discharged from a forward discharge port 343 is supplied to retard chambers 661 to 664 of the hydraulic actuator 60 via the actuator oil passage 368. At the initial stage of rotation of the vane rotor 63, the communication port 67 is closed to block communication between the oil pump 30 and the MG 39. After the vane rotor 63 starts rotating, the communication port 67 is opened, and the oil pump 30 and the MG 39 communicate with each other.

Figure 14:
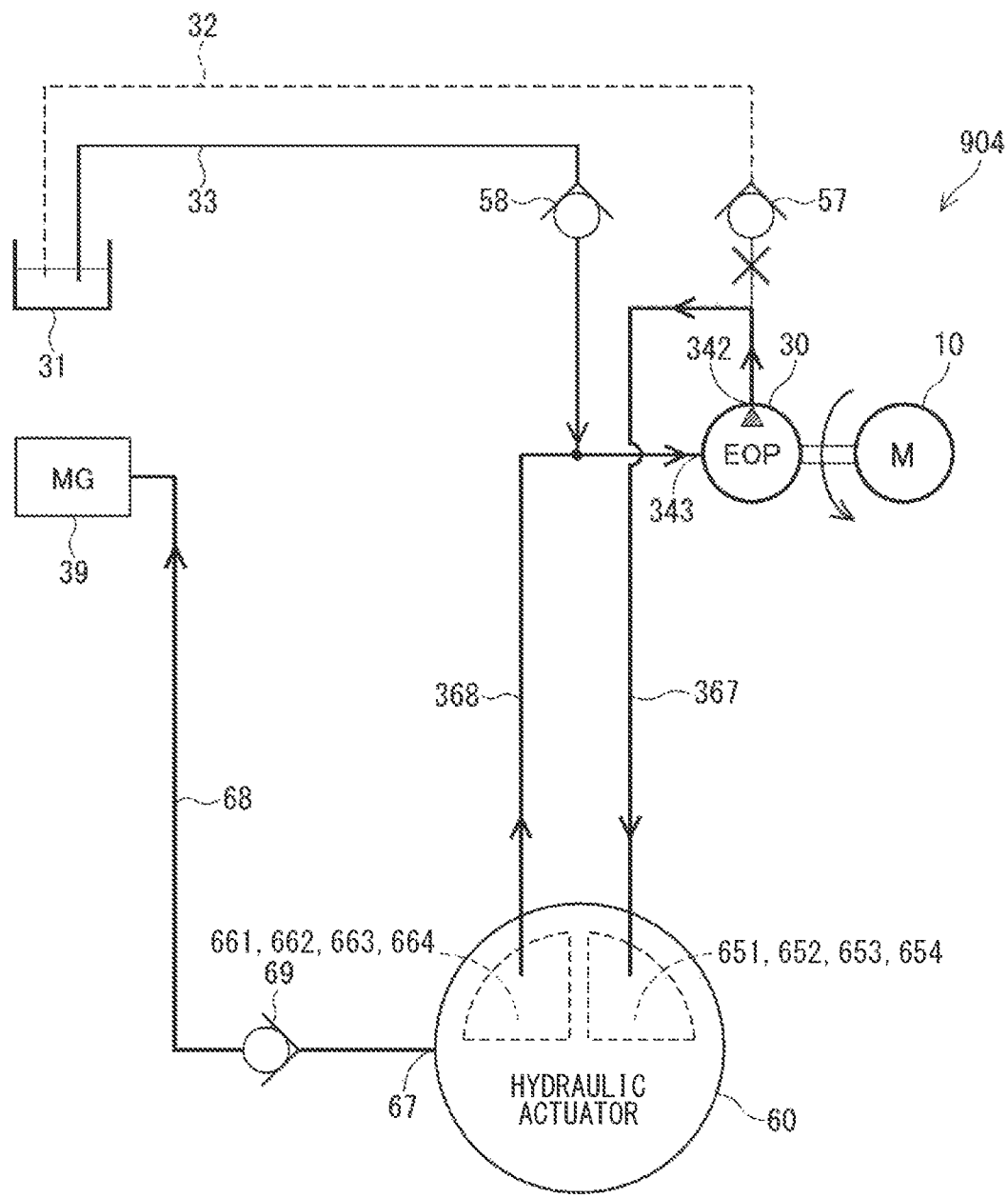
FIG. 14 is a diagram showing a hydraulic path at the time of being locked (advance state) according to the fourth embodiment.

At the time of being locked as shown in FIG. 14, when the oil pump 30 reverses, the oil discharged from a reverse discharge port 342 is supplied to advance chambers 651 to 654 of the hydraulic actuator 60 via the actuator oil passage 367. At the initial stage of rotation of the vane rotor 63, the communication port 67 is closed to block communication between the oil pump 30 and the MG 39. After the vane rotor 63 starts rotating, the communication port 67 is opened, and the oil pump 30 and the MG 39 communicate with each other.

In the third and fourth embodiments, since the flow of the oil in the operating direction of the hydraulic actuator 60 is switched by switching between forward and reverse rotation of the oil pump 30, a directional control valve 56 can be omitted. In addition, the hydraulic pressure supplied to the hydraulic actuator 60 is ensured by preventing backflow of oil to a suction using the suction check valves 57, 58. The suction check valves 57, 58 is not limited to one in each of the suction oil passages 32, 33 and a plurality of suction check valves may be provided.

Fifth Embodiment

A fifth embodiment will be described with reference to FIGS. 15 and 16. An integrated pump device 905 of the fifth embodiment differs from the first and third embodiments in a configuration of a hydraulic circuit for switching an operating direction of a hydraulic actuator 60. An oil pump 30 can rotate in both a forward direction and a reverse direction together with rotation of a motor 10, and a suction port and a discharge port are alternatively switched in accordance with a change of a rotation direction of the oil pump 30 similarly to the third embodiment. Further, a connection structure of a forward suction port 342 and a reverse suction port 343 of the oil pump 30 with the hydraulic actuator 60 is the same as that of the third embodiment.

A switching valve 59 in place of suction check valves 57, 58 of the third embodiment is provided at a forward suction passage 32 and a reverse suction passage 33. The switching valve 59 allows the oil to flow in the forward suction passage 32 and blocks the oil from flowing in the reverse suction passage 33 while the oil pump 30 rotates in a forward direction, and allows the oil to flow in the reverse suction passage 33 and blocks the oil from flowing in the forward suction passage 32 while the oil pump 30 rotates in the reverse direction. The switching valve 59 may be configured integrally as a module of the integrated pump device 905. The switching valve 59 is not limited to an electromagnetic valve, and may be a hydraulic switching valve that switches a spool depending on operating pressure.

Figure 15:
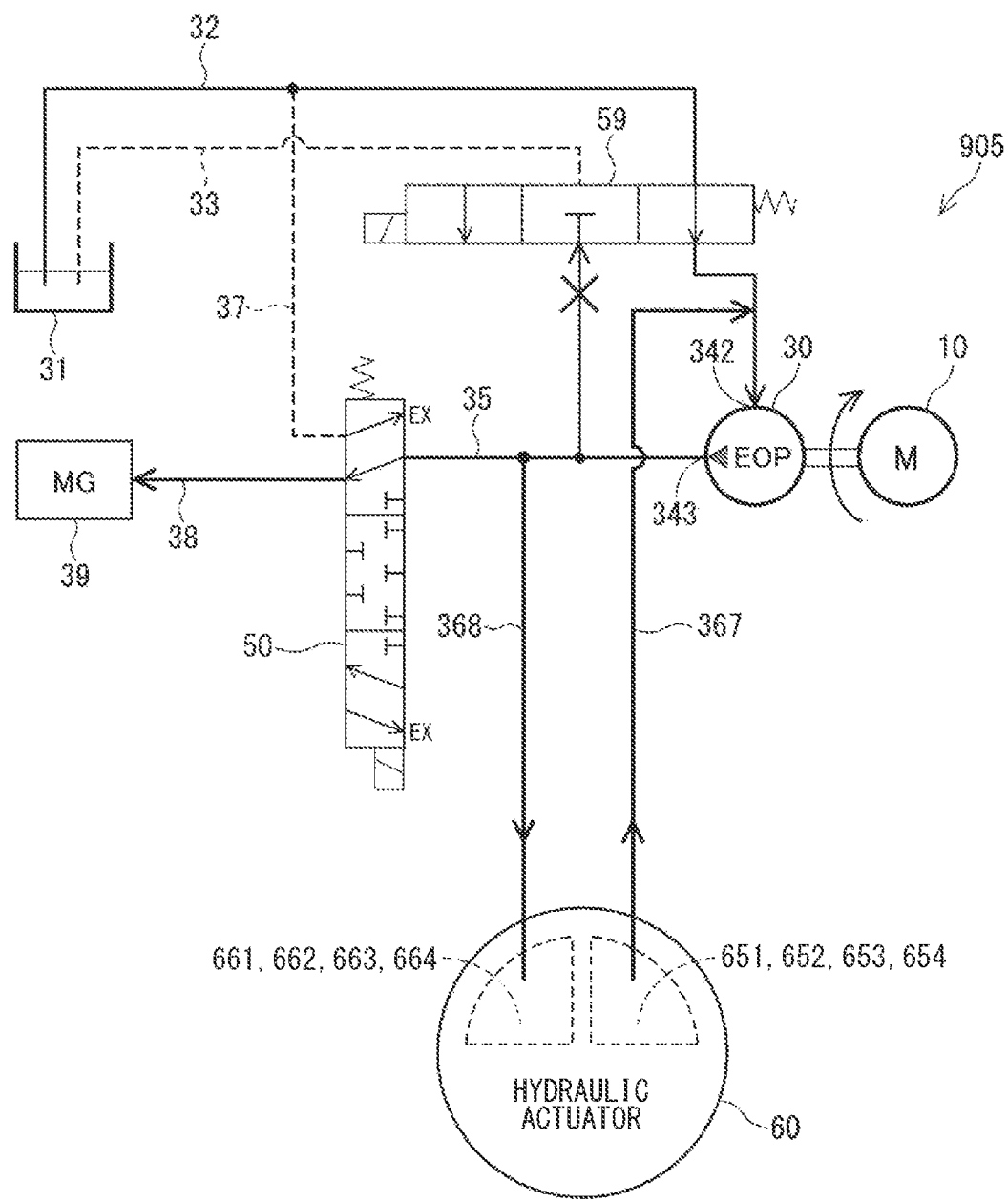
FIG. 15 is a diagram showing a hydraulic path at the time of being unlocked (retard state) according to the fifth embodiment.

At the time of being unlocked as shown in FIG. 15, the supply switching valve 50 is operated to a position where the direct supply passages 35, 38 communicate with each other. The switching valve 59 is made to open the forward suction passage 32. When the oil pump 30 rotates forward, the oil is drawn from the oil pan 31 into the forward suction port 342 via the forward suction passage 32. The oil discharged from the forward discharge port 343 of the oil pump 30 is supplied to the MG 39 via the direct supply passages 35, 38, and is also supplied to the retard chamber 661 to 664 of the hydraulic actuator 60 via the actuator oil passage 368.

At this time, the switching valve 59 closes the reverse suction passage 33 as indicated by an "x" mark in FIG. 15.

In addition, the oil is returned to the forward suction passage 32 from the advance chambers 651 to 654 of the hydraulic actuator 60 via the actuator oil passage 367. Thus, the hydraulic actuator 60 becomes in the retard state, and the parking lock mechanism 80 is unlocked.

Figure 16:
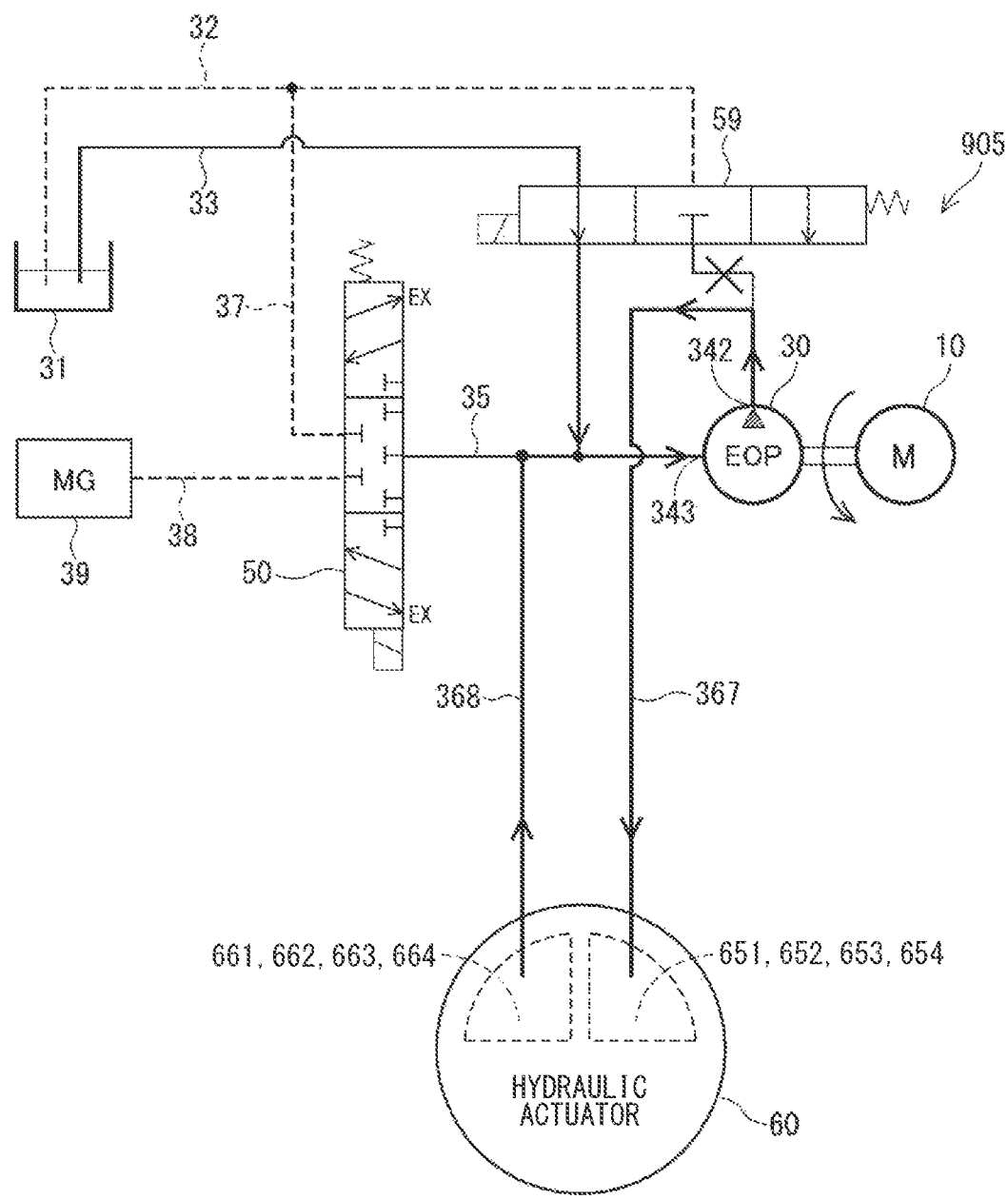
FIG. 16 is a diagram showing a hydraulic path at the time of being locked (advance state) according to the fifth embodiment.

At the time of being locked as shown in FIG. 16, the supply switching valve 50 is operated to a position where the direct supply passages 35, 38 are cut off. The switching valve 59 can open the reverse suction passage 33. When the oil pump 30 reverses, the oil is drawn from the oil pan 31 into the reverse suction port 343 via the reverse suction passage 33. The oil discharged from the reverse discharge port 342 is supplied to the advance chambers 651 to 654 of the hydraulic actuator 60 via the actuator oil passage 367.

At this time, the switching valve 59 closes the forward suction passage 32 as indicated by an "x" mark in FIG. 16. In addition, the oil is returned to the reverse suction passage 33 from the retard chambers 661 to 664 of the hydraulic actuator 60 via the actuator oil passage 368. Thus, the hydraulic actuator 60 becomes in the advance state, and the parking lock mechanism 80 is locked.

Sixth Embodiment

A sixth embodiment will be described with reference to FIGS. 17 and 18. An integrated pump device 906 of the sixth embodiment combines a configuration for switching an operating direction of a hydraulic actuator 60 according to the fifth embodiment and a configuration for supplying oil to a MG 39 according to the second embodiment. The operating direction of the hydraulic actuator 60 is switched by switching between forward and reverse rotations of the oil pump 30 and by an associated change of the switching valve 59. Also, the oil is supplied to the MG 39 from a communication port 67 formed in the hydraulic actuator 60 via a sub-supply passage 68. A consumption check valve 69 is provided in the sub-supply passage 68.

Figure 17:
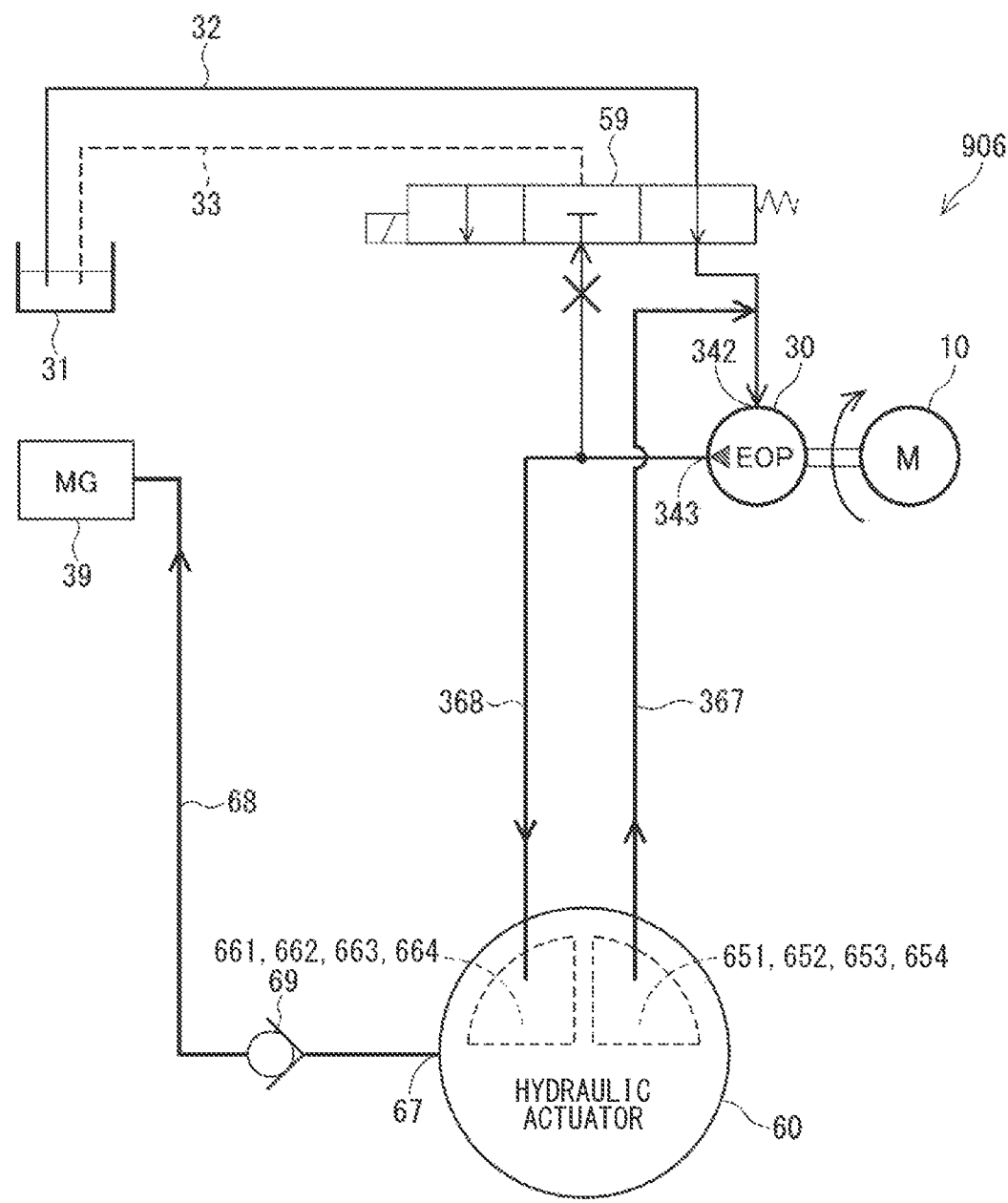
FIG. 17 is a diagram showing a hydraulic path at the time of being unlocked (retard state) according to the sixth embodiment.

At the time of being unlocked as shown in FIG. 17, when the oil pump 30 rotates forward, the oil discharged from a forward discharge port 343 is supplied to retard chambers 661 to 664 of the hydraulic actuator 60 via the actuator oil passage 368. At the initial stage of rotation of the vane rotor 63, the communication port 67 is closed to block communication between the oil pump 30 and the MG 39. After the vane rotor 63 starts rotating, the communication port 67 is opened, and the oil pump 30 and the MG 39 communicate with each other.

Figure 18:
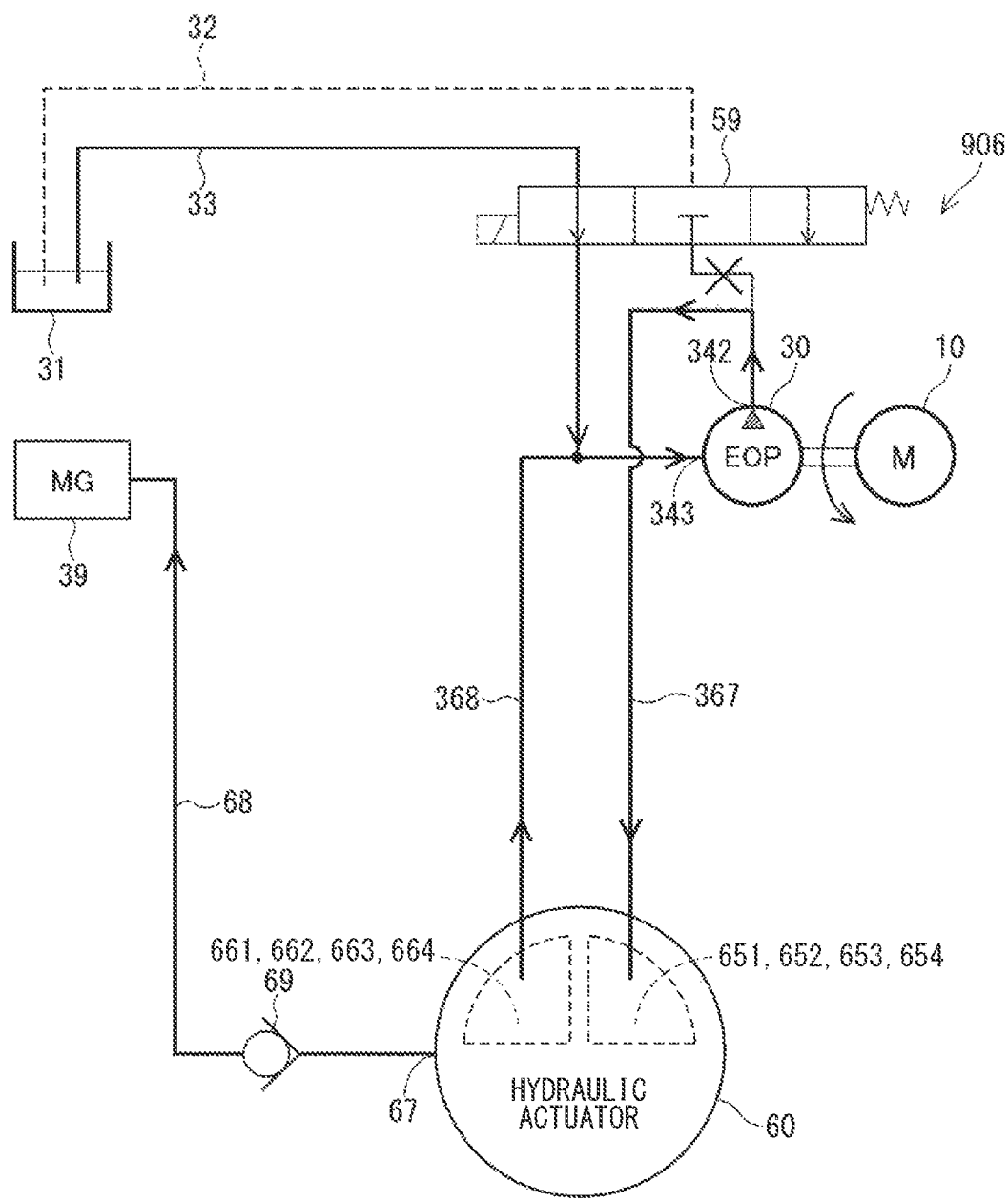
FIG. 18 is a diagram showing a hydraulic path at the time of being locked (advance state) according to the sixth embodiment.

At the time of being locked as shown in FIG. 18, when the oil pump 30 reverses, the oil discharged from a reverse discharge port 342 is supplied to advance chambers 651 to 654 of the hydraulic actuator 60 via the actuator oil passage 367. At the initial stage of rotation of the vane rotor 63, the communication port 67 is closed to block communication between the oil pump 30 and the MG 39. After the vane rotor 63 starts rotating, the communication port 67 is opened, and the oil pump 30 and the MG 39 communicate with each other.

In the fifth and sixth embodiments, since the operating direction of the hydraulic actuator 60 is switched by switching between forward and reverse rotations of the oil pump 30 and by the associated change of the switching valve 59, a directional control valve 56 can be omitted. In addition, the hydraulic pressure supplied to the hydraulic actuator 60 is ensured by preventing backflow of oil to a suction using the switching valve 59.

Reference Embodiment

Figure 19:
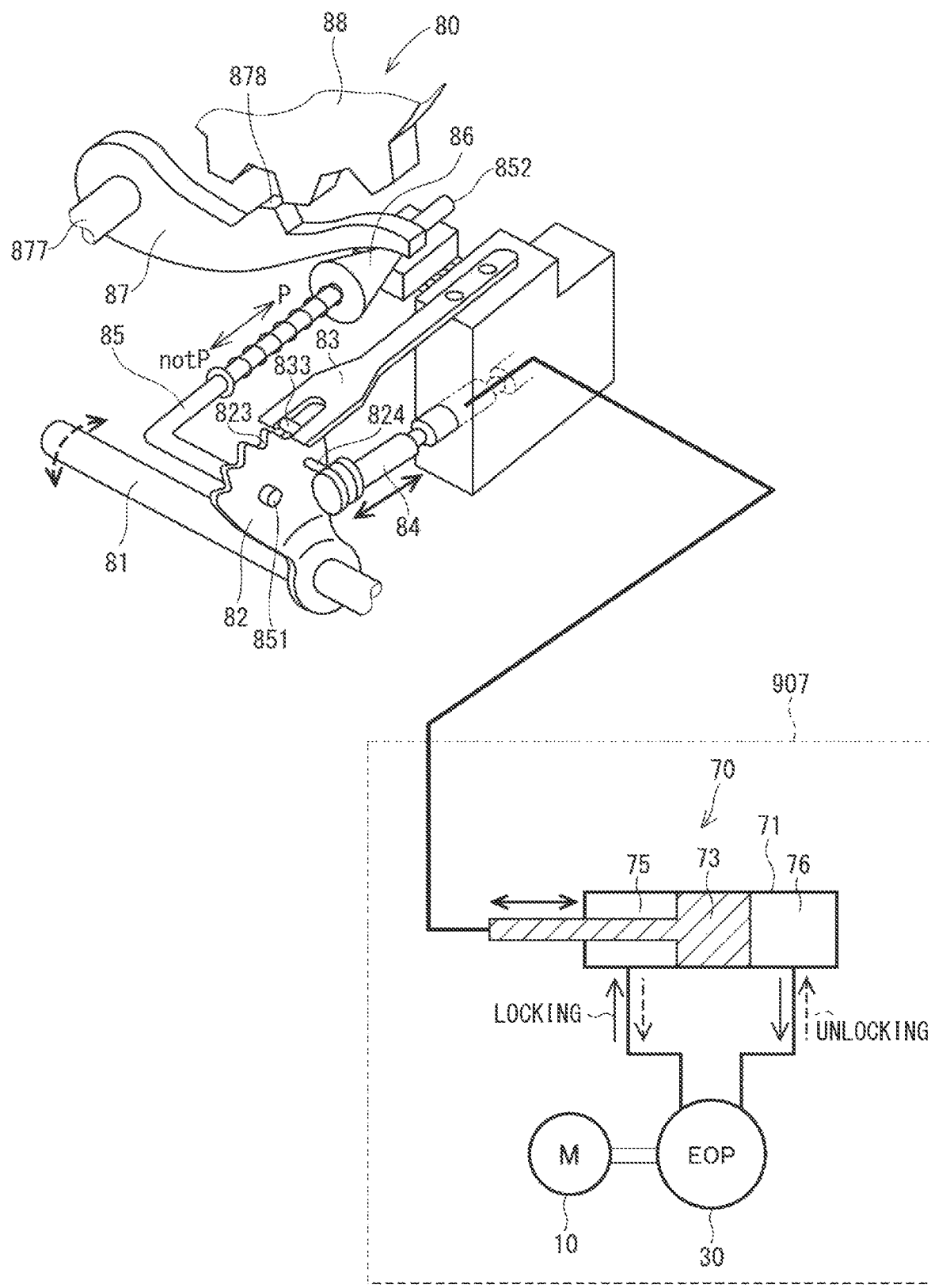
FIG. 19 is a configuration diagram of an integrated pump device and a parking lock mechanism using a cylinder type hydraulic actuator according to a reference embodiment.

Referring to FIG. 19, a reference embodiment of an integrated pump device 907 having a cylinder type hydraulic actuator 70 will be described. The cylinder type hydraulic actuator 70 includes a cylinder 71 and a piston 73 that reciprocates in the cylinder 71. An advance chamber 75 is provided in an area of the cylinder 71 in the axial direction of the piston 73, and a retard chamber 76 is provided in an another area of the cylinder 71 in the axial direction of the piston 73.

The piston 73 is linked to a switching rod 84 of a parking lock mechanism 80 as indicated by the thick arrow in FIG. 19. A tip of the switching rod 84 is engaged with a pin 824 provided on a detent plate 82. When the switching rod 84 reciprocates with the reciprocating movement of the piston 73, the detent plate 82 rotates via the pin 824 and the parking rod 85 moves, thereby switching between a P range and a not-P range.

An oil pump 30 can supply oil to the advance chamber 75 and the retard chamber 76 via ports 721, 722. A flow of the oil to each hydraulic chamber 75, 76 is switched based on movements of a rotary hydraulic actuator 60 of the first or second embodiment. The oil in the hydraulic chamber on the discharge side is returned to the suction side of the oil pump 30. In FIG. 19, illustration of the oil flow switching path is omitted.

At the time of being unlocked, hydraulic pressure is supplied from the oil pump 30 to the retard chamber 76, and the piston 73 moves leftward in FIG. 19 to become in a retard state. Then, as the switching rod 84 moves, the parking rod 85 moves in a not-P direction (i.e., notP direction), and the parking lock mechanism 80 is unlocked. At the time of being locked, the hydraulic pressure is supplied from the oil pump 30 to the advance chamber 75, and the piston 73 moves rightward in FIG. 19 to become in an advance state. Then, as the switching rod 84 moves, the parking rod 85 moves in a P direction, and the parking lock mechanism 80 is locked.

In the reference embodiment, the hydraulic actuator operates in the same manner as in the first to sixth embodiments. However, the reference embodiment differs from the first to sixth embodiments in that it is not intended to reduce a size of the integrated pump device.

Other Embodiments (1) The hydraulic actuator 60 is not limited to the parking lock actuator, and may be applied to any actuator such as a gear shift drum shift. In addition, depending on an actuator to be applied, what kind of state should be set as an advance state and a retard state may be appropriately set.

(2) The number of vanes of the vane rotor in the hydraulic actuator 60 is not limited to four as illustrated in FIG. 4, and a plurality of vanes may be provided if a pressure receiving area can be secured. The vane chamber of the housing is set according to the number of vanes. Further, a stopper for restricting rotation of a vane rotor may be provided between a vane rotor main body and the housing instead of being provided on the vane.

(3) The oil consumption device to which the oil is supplied from the oil pump 30 is not limited to the MG 39, and may be any device that consumes the oil. In the second, fourth, and sixth embodiments, if the oil consumption device has a backflow prevention function inside, a consumption check valve 69 may not be provided at a sub-supply passage 68.

The present disclosure is not limited to the above embodiments but various modifications may be made further within the scope of the present disclosure without departing from the spirit of the disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An integrated pump device comprising:
a motor;
an oil pump rotated by a driving force of the motor and configured to discharge oil drawn from an oil pan; and
a hydraulic actuator configured to switch between an advance state and a retard state by a hydraulic pressure created by the oil pump, wherein
the motor, the oil pump and the hydraulic actuator are integrated to configure an integrated module,
the hydraulic actuator is a parking lock actuator which operates a parking lock mechanism of an automobile,
the hydraulic actuator includes: a housing having one or more vane chambers; and a vane rotor housed in the housing and including one or more vanes respectively arranged in the vane chambers,
an advance chamber is provided in an area of the vane chamber in a circumferential direction of the vane,
a retard chamber is provided in an another area of the vane chamber in the circumferential direction, and,
the vane rotor is configured
to rotate in one direction to enter the advance state when the hydraulic pressure is supplied to the advance chamber, and
to rotate in an other direction to enter the retard state when the hydraulic pressure is supplied to the retard chamber,
the parking lock actuator locks the parking lock mechanism at the advance state, and unlocks the parking lock mechanism at the retard state,
the integrated pump further comprises a directional control valve configured to switch a flow of the oil flowing into the advance chamber or into the retard chamber from the oil pump,
the hydraulic actuator is connected to an oil consumption device via a sub-supply passage,
at least one of the vane chambers includes a communication port communicating with the sub-supply passage at a position between the advance chamber and the retard chamber in the circumferential direction,
at an initial stage of rotation of the vane rotor, the vane closes the communication port in the hydraulic chamber to which hydraulic pressure is supplied from the oil pump, and
when the communication port is opened in the hydraulic chamber to which the hydraulic pressure is supplied from the oil pump after the vane rotor starts to rotate, the vane is made to supply the oil, delivered from the oil pump to the hydraulic actuator, to the oil consumption device via the sub-supply passage.

2. An integrated pump device comprising:
a motor;
an oil pump rotated by a driving force of the motor and configured to discharge oil drawn from an oil pan; and
a hydraulic actuator configured to switch between an advance state and a retard state by a hydraulic pressure created by the oil pump, wherein
the motor, the oil pump and the hydraulic actuator are integrated to configure an integrated module,
the hydraulic actuator includes: a housing having one or more vane chambers; and a vane rotor housed in the housing and including one or more vanes respectively arranged in the vane chambers,
an advance chamber is provided in an area of the vane chamber in a circumferential direction of the vane,
a retard chamber is provided in an another area of the vane chamber in the circumferential direction, and,
the vane rotor is configured
to rotate in one direction to enter the advance state when the hydraulic pressure is supplied to the advance chamber, and
to rotate in an other direction to enter the retard state when the hydraulic pressure is supplied to the retard chamber,
the oil pump is configured to rotate in a forward direction and a reverse direction, and to have a suction port and a discharge port which are alternatively replaced in the forward direction and in the reverse direction,
a forward suction port which functions as the discharge port while the oil pump rotates in the reverse direction is connected to the advance chamber,
a reverse suction port which functions as the discharge port while the oil pump rotates in the forward direction is connected to the retard chamber,
first and second suction check valves are configured to prevent the oil flowing from the oil pump to the oil pan,
the first suction check valve is provided in a forward suction passage connected to the forward suction port,
the second suction check valve is provided in a reverse suction passage connected to the reverse suction port, and
the oil pump is switched between the forward direction and the reverse direction, to switch a flow of the oil from the oil pump to the advance chamber or the retard chamber.

3. An integrated pump device comprising:
a motor;
an oil pump rotated by a driving force of the motor and configured to discharge oil drawn from an oil pan; and
a hydraulic actuator configured to switch between an advance state and a retard state by a hydraulic pressure created by the oil pump, wherein
the motor, the oil pump and the hydraulic actuator are integrated to configure an integrated module,
the hydraulic actuator includes: a housing having one or more vane chambers; and a vane rotor housed in the housing and including one or more vanes respectively arranged in the vane chambers,
an advance chamber is provided in an area of the vane chamber in a circumferential direction of the vane,
a retard chamber is provided in an another area of the vane chamber in the circumferential direction, and,
the vane rotor is configured
to rotate in one direction to enter the advance state when the hydraulic pressure is supplied to the advance chamber, and
to rotate in an other direction to enter the retard state when the hydraulic pressure is supplied to the retard chamber,
the oil pump is configured to rotate in a forward direction and a reverse direction, and to have a suction port and a discharge port which are alternatively replaced in the forward direction and in the reverse direction, a forward suction port which functions as the discharge port while the oil pump rotates in the reverse direction is connected to the advance chamber, a reverse suction port which functions as the discharge port while the oil pump rotates in the forward direction is connected to the retard chamber, a switching valve is configured: (i) to change in a direction of the flow of the oil between a forward suction passage connecting the forward suction port to the oil pan and a reverse suction passage connecting the reverse suction port to the oil pan; (ii) to allow the oil to flow in the forward suction passage while the oil pump rotates in the forward direction and to block the oil to flow in the reverse suction passage; (iii) to allow the oil to flow in the reverse suction passage while the oil pump rotates in the reverse direction and to block the oil to flow in the forward suction passage, and, the oil pump is switched between the forward direction and the reverse direction, and the switching valve is switched in response to the oil pump, to switch a flow of the oil from the oil pump to the advance chamber or the retard chamber.

4. The integrated pump device according to claim 2, wherein the oil pump is connected to an oil consumption device via a direct supply passage branched from an oil passage which supplies the hydraulic pressure to the hydraulic actuator, and a supply switching valve is provided in the direct supply passage to communicate the direct supply passage with the oil consumption device and to block the direct supply passage from the oil consumption device.

5. The integrated pump device according to claim 1, further comprising a consumption check valve provided at the sub-supply passage to prevent a reverse flow of the oil from the oil consumption device to the hydraulic actuator.

6. The integrated pump device according to claim 2, wherein the hydraulic actuator is a parking lock actuator which operates a parking lock mechanism of an automobile, and the parking lock actuator locks the parking lock mechanism at the advance state, and unlocks the parking lock mechanism at the retard state.

* * * * *